United States Patent
Avula et al.

(10) Patent No.: US 10,285,048 B2
(45) Date of Patent: May 7, 2019

(54) MOBILITY MANAGEMENT NODE SELECTION TO SUPPORT CLOUD-CENTRIC ENVIRONMENTS

(71) Applicant: Verizon Patent and Licensing Inc., Arlington, VA (US)

(72) Inventors: Niranjan B. Avula, Frisco, TX (US); Sudhakar Reddy Patil, Flower Mound, TX (US); Arda Aksu, Lafayette, CA (US); Gerardo S. Libunao, Manalapan, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 64 days.

(21) Appl. No.: 15/696,526

(22) Filed: Sep. 6, 2017

(65) Prior Publication Data
US 2019/0075452 A1    Mar. 7, 2019

(51) Int. Cl.
*H04W 4/00* (2018.01)
*H04W 8/24* (2009.01)
(Continued)

(52) U.S. Cl.
CPC .......... *H04W 8/245* (2013.01); *H04W 8/005* (2013.01); *H04W 8/08* (2013.01);
(Continued)

(58) Field of Classification Search
CPC ..... H04W 88/08; H04W 48/20; H04W 8/183; H04W 48/16; H04W 48/08; H04L 12/28; H04L 45/16; H04L 12/1886; H04L 63/10; H04M 15/66; H04M 11/04; H04N 21/235; H04Q 2213/13516; G06F 3/02;
(Continued)

(56) References Cited

U.S. PATENT DOCUMENTS 7,035,932 B1 *  4/2006  Dowling ................ G06Q 20/04
                                                    709/230
9,559,981 B2 *  1/2017  Hiscock ................ H04L 63/102
(Continued)

FOREIGN PATENT DOCUMENTS

EP          3373620 A1 *  9/2018 ............. H04W 8/04
WO   WO-2012138141 A2 * 10/2012 ............. H04W 8/08
(Continued)

*Primary Examiner* — Mahendra Patel

(57) ABSTRACT

A first network device determines a set ID associated with a first set of management instances in at least one network, wherein the management instances execute network access or mobility management functions for UE interaction with a wireless network and wherein a first management instance is a member of the first set of management instances. The first network device determines a first pointer value associated with the first management node, generates a first global ID, for the first management instance, that includes the set ID and the first pointer value, and installs the first management instance at a second network device, along with the first global ID, the set ID, and the first pointer value. The first network device changes the first pointer value in response to an event, wherein the event is associated with planned maintenance, a planned upgrade, or an existing or predicted outage of the wireless network.

20 Claims, 24 Drawing Sheets

(51) Int. Cl.
*H04W 64/00* (2009.01)
*H04W 8/00* (2009.01)
*H04W 8/08* (2009.01)
*H04W 36/00* (2009.01)
*H04W 88/18* (2009.01)

(52) U.S. Cl.
CPC ..... *H04W 36/0088* (2013.01); *H04W 64/003* (2013.01); *H04W 88/182* (2013.01)

(58) Field of Classification Search
CPC ... G01S 19/48; G06Q 20/123; G06T 2200/24; G01C 21/36
USPC ............... 370/329, 241, 328, 338, 390, 503; 455/411, 431, 434
See application file for complete search history.

(56) References Cited

U.S. PATENT DOCUMENTS

| | | | | |
|---|---|---|---|---|
| 9,843,624 | B1* | 12/2017 | Taaghol | H04L 67/10 |
| 9,860,677 | B1* | 1/2018 | Agerstam | H04L 67/28 |
| 2002/0089949 | A1* | 7/2002 | Bjelland | H04W 24/02 370/331 |
| 2006/0227746 | A1* | 10/2006 | Kim | H04W 36/005 370/331 |
| 2006/0276192 | A1* | 12/2006 | Dutta | H04W 36/005 455/436 |
| 2008/0032695 | A1* | 2/2008 | Zhu | H04W 36/0022 455/442 |
| 2008/0146265 | A1* | 6/2008 | Valavi | G06F 1/1626 455/550.1 |
| 2009/0264130 | A1* | 10/2009 | Catovic | H04W 36/00835 455/436 |
| 2009/0270099 | A1* | 10/2009 | Gallagher | H04W 8/08 455/435.1 |
| 2009/0274115 | A1* | 11/2009 | Schindler | H04W 36/0011 370/331 |
| 2012/0258766 | A1* | 10/2012 | Cho | H04W 8/08 455/525 |
| 2014/0221001 | A1* | 8/2014 | Yang | H04W 4/70 455/456.1 |
| 2014/0307710 | A1* | 10/2014 | Schindler | H04W 36/0011 370/331 |
| 2015/0257124 | A1* | 9/2015 | Karimli | H04W 64/006 455/436 |
| 2016/0344621 | A1* | 11/2016 | Roeland | H04L 45/38 |
| 2016/0373521 | A1* | 12/2016 | Washbrook | H04L 67/1002 |
| 2017/0048172 | A1* | 2/2017 | Chavez | H04L 51/066 |
| 2018/0132015 | A1* | 5/2018 | Borrelli | G06T 11/60 |
| 2018/0242206 | A1* | 8/2018 | Kim | H04W 4/06 |
| 2018/0324652 | A1* | 11/2018 | Ryu | H04W 8/04 |

FOREIGN PATENT DOCUMENTS

| | | | | |
|---|---|---|---|---|
| WO | WO-2012151925 | A1 * | 11/2012 | H04W 4/70 |
| WO | WO-2015105301 | A1 * | 7/2015 | H04W 8/02 |
| WO | WO-2017069598 | A1 * | 4/2017 | H04W 68/02 |
| WO | WO-2017078485 | A1 * | 5/2017 | H04W 8/04 |

* cited by examiner

MOBILITY MANAGEMENT NODE SELECTION TO SUPPORT CLOUD-CENTRIC ENVIRONMENTS

BACKGROUND

Mobility management in wireless networks involves the assigning and controlling of wireless links for mobile device connection to the wireless networks. Mobility management functions in the wireless networks may, among other functions, determine when link transfers from a mobile device, between wireless access interfaces, need to occur, and coordinate such link transfers. The link transfers may be called "hand offs," and the performed functions may be called "hand off management." Mobility management in wireless networks, such as, for example, current Fourth Generation (4G) and 4.5G wireless networks, and proposed Next Generation wireless networks (e.g., Fifth Generation (5G)), typically contain two components: location management and handoff management. The location management function tracks the attachment points of mobile devices between consecutive communications. The handoff management function maintains a mobile device's connection as the mobile device moves and changes its access point to the wireless network.

DETAILED DESCRIPTION OF THE PREFERRED EMBODIMENTS

Figure 1:
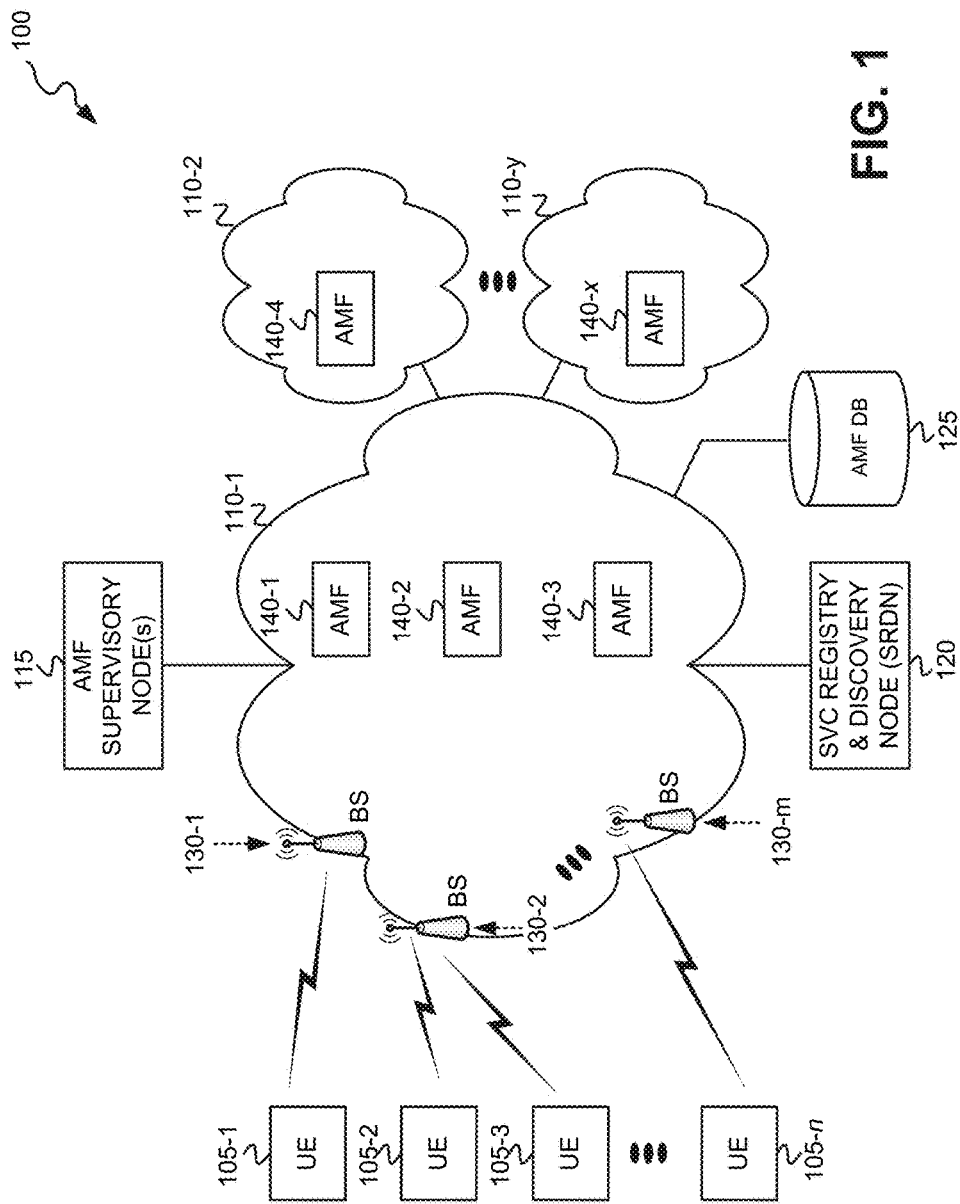
FIG. 1 is a diagram that depicts an exemplary network environment in which enhanced mechanisms for selection of mobility management nodes, associated with a wireless network, are employed to support cloud-centric environments.

The following detailed description refers to the accompanying drawings. The same reference numbers in different drawings may identify the same or similar elements. The following detailed description does not limit the invention.

In 4G and 5G networks, connectivity between the nodes of the Radio Access Network (RAN) is established based on a static configuration within the base station (e.g., an evolved Node B (eNB) or a next generation Node B (gNB)), and/or the mobility management entity (MME) or access and mobility management function (AMF). The static configuration binds the mobility management entity or function to specific Tunnel Network Layer (TNL) connections (and Internet Protocol (IP) addresses) within the network, and mobility management function relocation is, therefore, constrained by the TNL connection binding. In order to take advantage of cloud-centric deployments, however, with mobility management functions spread across multiple cloud regions, the mobility management entities or functions deployed on top of a cloud infrastructure should be portable between the cloud regions, both in the same site and across geographic locations.

Relocation of mobility management entities or functions becomes particularly important when there are failures and/or planned maintenance activities within the network. When there is a failure, either a new instance of MME or AMF is created elsewhere in the network, or existing MMES or AMFs may serve as backups for the failed MME or AMF. In the case of planned maintenance, a new MME or AMF instance could be created (e.g., with a new software version), and the old MME or AMF instance could be taken out of service. In cloud-centric deployments, such events are expected to be common and should be planned for. In such cloud-centric deployments, when an MME or AMF instance, having a TNL connection with the serving base station, has failed, MMES or AMFs in alternate cloud regions may be used to maintain service continuity. However, MME or AMF instances in alternate cloud regions will have different IP addresses and TNL links, resulting in a loss of service.

Exemplary embodiments described herein maintain a dynamic configuration of connectivity between base stations and MMES or AMFs such that MME/AMF failures or planned maintenance activities may be flexibly supported in cloud-centric deployments. The dynamic configuration of the connectivity between the base stations and the MMEs/AMFs is maintained by a service registry and discovery mechanism that updates a database of pointers based on planned network maintenance, planned network upgrades, existing or predicted network outages, and/or addition or deletion of MME/AMF instances from the cloud-centric environment. In one exemplary implementation, the dynamic configuration of the connectivity between the base stations and the MMES/AMFs is maintained by a Domain Name Server (DNS). According to another exemplary implementation, the dynamic configuration of the connectivity between base stations and the MMEs/AMFs may be maintained by another type of network device or node (e.g., a repository device, a database management system (DBMS), a base station). As MMES or AMFs fail, and/or are permanently or temporarily removed or added, the DNS, or the other type of network device/node, changes pointers within a database that is used to configure the connectivity between base stations and the MMEs/AMFs. The database may be associated with the DNS, or may be maintained independently of the DNS. The pointers are used to identify one or more MMES/AMFs that can support service requests from particular user equipment. Updating of the pointers enables an on-going, dynamic reconfiguration of the connectivity of the base station and MIME/AMF that permits the maintenance of service continuity in the event of MME/AMF failure or removal within the network.

FIG. 1 is a diagram that depicts an exemplary network environment 100 in which enhanced mechanisms for selection of mobility management nodes, associated with a wireless network, are employed to support cloud-centric deployments. Network environment 100 includes multiple user equipments (UEs) 105-1 through 105-n, multiple networks 110-1 through 110-y, an AMF supervisory node(s) 115, a service (SVC) registry and discovery node (SRDN) 120, an AMF database (DB) 125, multiple base stations 130-1 through 130-m, and multiple AMF instances 140-1 through 140-x.

UEs 105-1 through 105-n (referred to herein as "UE 105" or "UEs 105") may each include any type of computational device that may communicate with network 110-1 via a wireless connection. UEs 105 may each include, for example, a desktop, laptop, or tablet computer, a personal digital assistant (PDA), a "smart" phone, or an "Internet of Things" (IoT) device. A "user" (not shown) may own, operate, administer, and/or carry each of UEs 105.

Network(s) 110-1 may include one or more networks that further include a wireless network, such as, for example, a wireless public land mobile network (PLMN) or a wireless satellite network. The PLMN may include a Code Division Multiple Access (CDMA) 2000 PLMN, a GSM PLMN, a Long Term Evolution (LTE) PLMN and/or other types of PLMNs not specifically described herein. In one implementation, the wireless network of network(s) 110-1 includes a 4G or 5G LTE network.

Networks 110-2 through 110-y may each include one of various types of networks, including one of a telecommunications network (e.g., a Public Switched Telephone Network (PSTN), PLMN, or satellite network), a local area network (LAN), a wide area network (WAN), a metropolitan area network (MAN), an intranet, the Internet, and/or a cable network (e.g., an optical cable network).

AMF supervisory node(s) 115 includes one or more network devices that supervise the installation of AMF instances into networks 110, and supervise the removal of AMF instances from networks 110. AMF supervisory node(s) 115 additionally may perform a dynamic discovery process(es) that determines active and available AMF instances within networks 110, and changes AMF pointers within AMF DB 125 based on results of the dynamic discovery process(es). The dynamic discovery process(es) may include algorithms that analyze planned network maintenance, planned network upgrades, existing or predicted network outages, and/or addition/deletion of AMF instances from networks 110 by AMF supervisory node(s) 115 to determine AMF instances 140 that are active and available for use.

SRDN 120 includes one or more network devices that access AMF DB 125 to identify AMF instances that correspond to particular AMF pointers provided to SRDN 120 for service requests related to UE 105. In one implementation, SRDN 120 may include a Domain Name System (DNS) server. In other implementations, a different node than a DNS server may maintain the pointers within, and access, AMF DB 125. For example, SRDN 120 may be implemented at each base station 130, at a repository device, or at a database management system (DBMS).

AMF DB 125 includes one or more network devices having memory that stores a data structure that further stores information about each AMF instance 140 installed within networks 110. Details of the information about each AMF instance 140 stored in AMF DB 125 is described below with respect to the exemplary data structure depicted in FIG. 4.

Base stations 130-1 through 130-m each includes a transceiver system that connects UEs 105 to other components of network(s) 110-1 using wireless interfaces. Each of base stations 130 may include an antenna array, transceiver circuitry, and other hardware and software components for enabling UEs 105 to wirelessly transmit data to a respective base station 130, and to wirelessly receive data from a respective base station 130. Each base station 130 connects to other components of network(s) 110-1 such that data received from a source UE 105 may be forwarded towards its destination in networks 110, or data received from a source in networks 110 may be forwarded to a destination UE 105. When the wireless network of network(s) 110-1 is implemented as a 4G LTE network, each of base stations 130 may include an eNB. When the wireless network of network(s) 110-1 is implemented as a 5G LTE network, each of base stations 130 may include a gNB.

AMF instances 140-1 through 140-x may each include a software instance (i.e., application, program, or subroutine) that executes functions to act as a key control node for the wireless network of network(s) 110-1. The functions executed by AMF instances 140 may include a UE access function that controls the access of UEs 105 to the wireless network, and/or a mobility management function that facilitates the mobility of UEs (i.e., roaming) within the wireless network of network(s) 110-1. As shown in FIG. 1, AMFs instances 140 may be installed at one or more network devices/nodes in network(s) 110-1, network 110-2, and/or network 110-y. The AMF instances 140, which may be available to perform access control and/or mobility management functions for one or more of UEs 105, may, as depicted in FIG. 1, be distributed across multiple networks 110 in the cloud-centric network environment 100. In a case where network(s) 110-1 includes a 4G network, each AMF instance 140 may include a MME. In a case where network(s) 110-1 includes a 5G network, each AMF instance 140 may include a 5G core Access and Mobility Function (AMF). AMF instances 140 may alternatively be referred to herein as "mobility management node," "mobility management function," "management function," or "management node." Each of AMF instances 140-1 through 140-x may be installed at a respective network node/network device within networks 110 by, for example, AMF supervisory node(s) 115. In networks having network architectures other than 4G or 5G, AMF instances 140 may each operate to perform UE wireless network access and/or UE network mobility functions, and may have a different nomenclature than the MME of a 4G network or the AMF of a 5G network.

The configuration of the components of the cloud-centric network environment 100 depicted in FIG. 1 is for illustrative purposes only, and other configurations may be implemented. Therefore, network environment 100 may include additional, fewer and/or different components, that may be configured differently, than depicted in FIG. 1 and described herein. For example, though a single SRDN 120 is shown in FIG. 1, network environment 100 may include multiple SRDNs 120, where each SRDN 120 may service a different network of networks 110, a different portion of a network of networks 110, or a different "slice" of network(s) 110-1.

Figure 2:
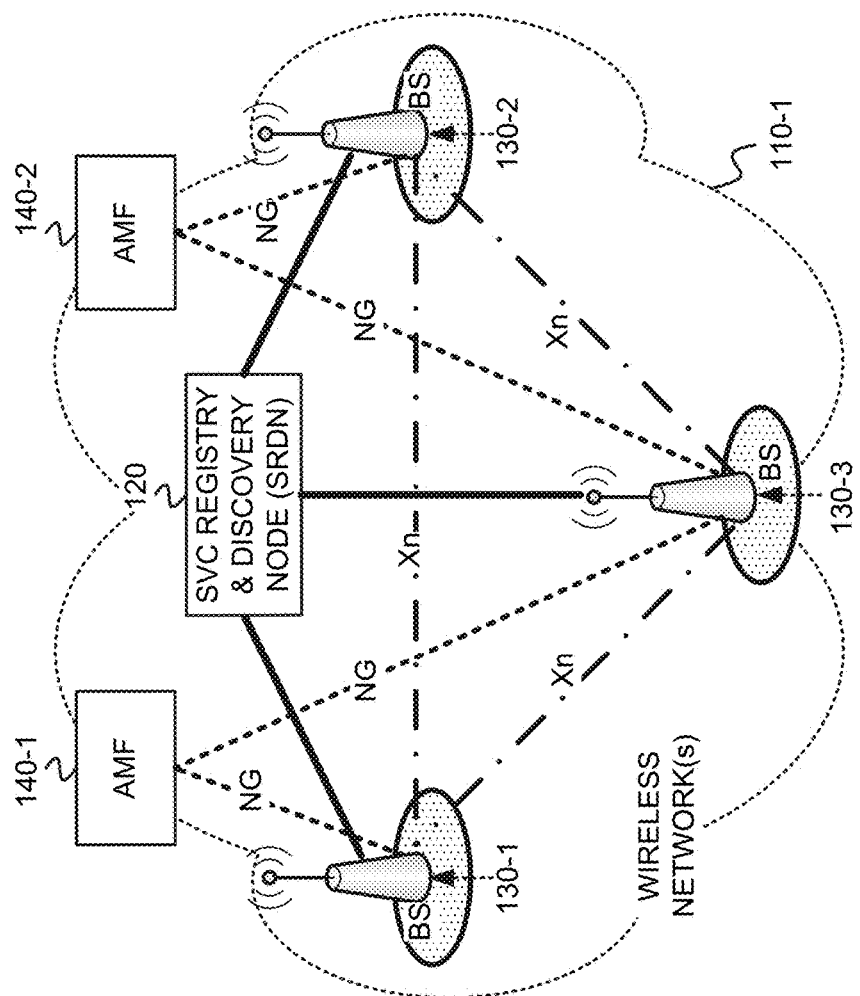
FIG. 2 is a diagram that depicts a simplified example of one of the networks of FIG. 1.

FIG. 2 depicts a simplified example of network(s) 110-1, including the communication interfaces/links between the various AMF instances 140, base stations 130, and SRDN 120. As illustrated, FIG. 2 shows two AMF instances 140-1 and 140-2, three base stations 130-1, 130-2 and 130-3, and a single SRDN 120. As shown in FIG. 2, AMF instance 140-1 has a TNL connection interface (identified as "NG") to base stations 130-1 and 130-3, and AMF instance 140-2 has a TNL connection interface (also identified as "NG") to base stations 130-2 and 130-3. Each of base stations 130-1, 130-2 and 130-3 has a connection interface (identified as "Xn") to each other of the base stations via network 110-1. As further shown, SRDN 120 has a respective link with each of base stations 130-1, 130-2, and 130-3 via network 110-1.

Figure 3:
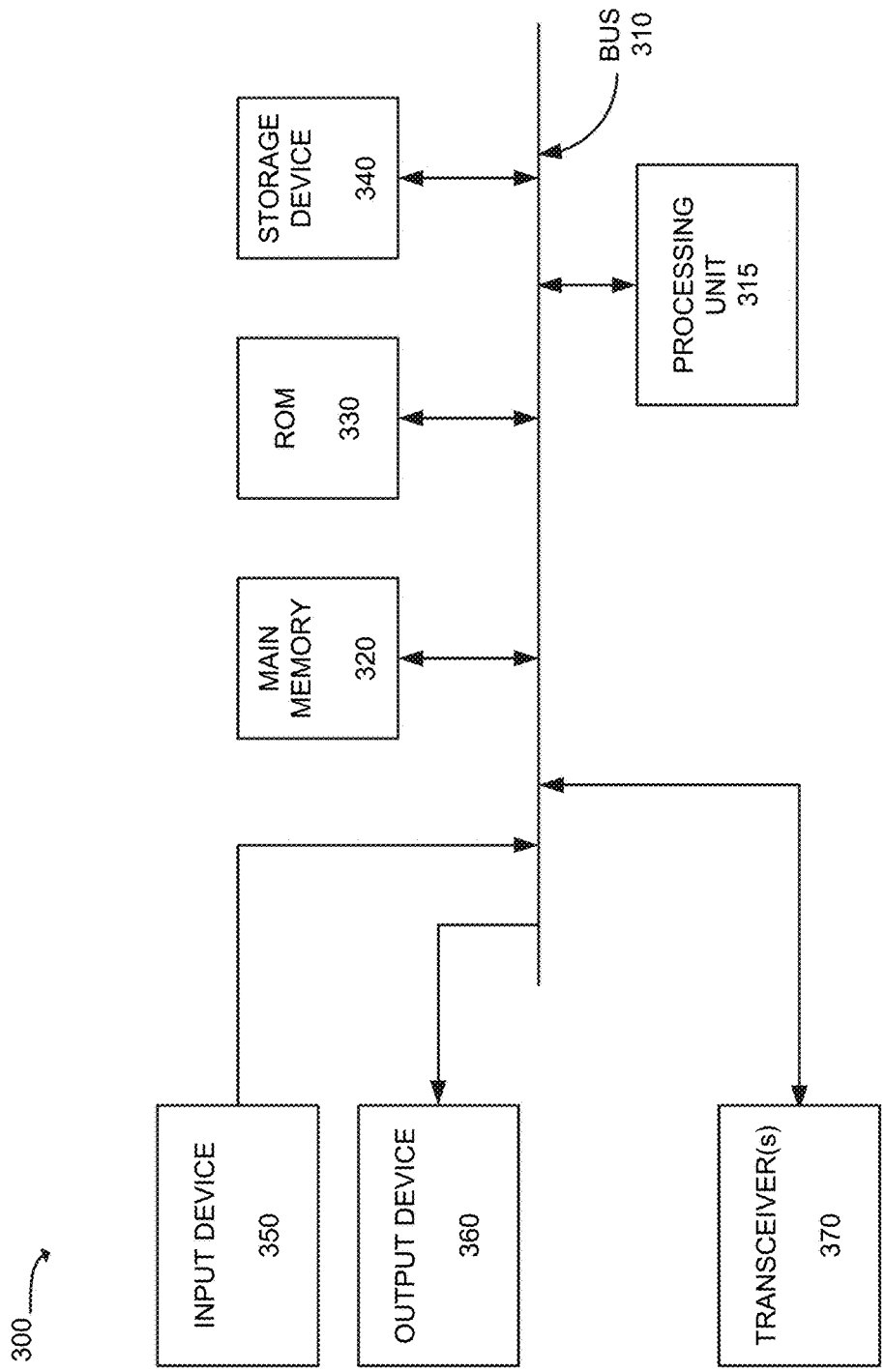
FIG. 3 is a diagram of exemplary components of a network device that may correspond to an Access and Mobility Function supervisory (AMF) node, a base station, a service registry and discovery node, an AMF database, and/or a user equipment of FIG. 1.

FIG. 3 is a diagram of exemplary components of a network device 300. Network device 300 may correspond to an AMF supervisory node 115, base station 130, SRDN 120, AMF DB 125, and/or UE 105 depicted in FIG. 1. Additionally, network device 300 may correspond to a network node/network device, not depicted in FIG. 1, at which an AMF instance 140 is installed and executed. Network device 300 may include a bus 310, a processing unit 315, a main memory 320, a read only memory (ROM) 330, a storage device 340, an input device 350, an output device 360, and a transceiver(s) 370. Bus 310 may include a path that permits communication among the elements of network device 300.

Processing unit 315 may include a processor, or microprocessor, that interprets and executes instructions, or may include logic that performs certain operations/processes. Main memory 320 may include a random access memory (RAM) or another type of dynamic storage device that may store information and instructions for execution by processing unit 315. ROM 330 may include a Read Only Memory (ROM) device or another type of static storage device (e.g., Electrically Erasable Programmable ROM (EEPROM)) that may store static information and instructions for use by processing unit 315. Storage device 340 may include a magnetic and/or optical recording medium and its corresponding drive. Main memory 320, ROM 330 and storage device 340 may each be referred to herein as a "non-transitory computer-readable medium" or a "non-transitory storage medium."

Input device 350 may include one or more devices that permit a user or operator to input information to network device 300, such as, for example, a keypad or a keyboard, a display with a touch sensitive panel, voice recognition and/or biometric mechanisms, etc. Output device 360 may include one or more devices that output information to the operator or user, including a display, a speaker, etc. Input device 350 and output device 360 may, in some implementations, be implemented as a graphical user interface (GUI) that displays GUI information and which receives user input via the GUI. In some implementations, such as when network device 300 is a base station 130 or an AMF DB 125, input device 350 and output device 360 may be omitted from network device 300. Transceiver(s) 370 may include one or more transceivers that enable network device 300 to communicate with other devices and/or systems. For example, in the case where network device 300 is a base station 130, transceiver(s) 370 may include a wireless transceiver (including an array of antennas) for communicating with one or more UEs 105, and a wired transceiver for communicating with other components of network(s) 110-1. In some implementations, transceiver(s) 150 may include a Global Positioning System (GPS) device that can determine the geographic location of network device 300. In the cases of AMF supervisory node(s) 115, SRDN 120, AMF DB 125, and AMF instances 140, transceiver(s) 370 may include a wired transceiver for communicating via networks 110.

Network device 300 may perform certain operations or processes, as may be described herein. Network device 300 may perform these operations in response to processing unit 315 executing software instructions contained in a computer-readable medium, such as memory 320. A computer-readable medium may be defined as a physical or logical memory device. A logical memory device may include memory space within a single physical memory device or spread across multiple physical memory devices. The software instructions may be read into main memory 320 from another computer-readable medium, such as storage device 340, or from another device via transceiver(s) 370. The software instructions contained in main memory 320 may cause processing unit 315 to perform the operations or processes, as described herein. Alternatively, hardwired circuitry (e.g., logic hardware) may be used in place of, or in combination with, software instructions to implement the operations or processes, as described herein. Thus, exemplary implementations are not limited to any specific combination of hardware circuitry and software.

The configuration of components of network device 300 illustrated in FIG. 3 is for illustrative purposes only. It should be understood that other configurations may be implemented. Therefore, network device 300 may include additional, fewer and/or different components, arranged in a different configuration, than depicted in FIG. 3.

Figure 4:
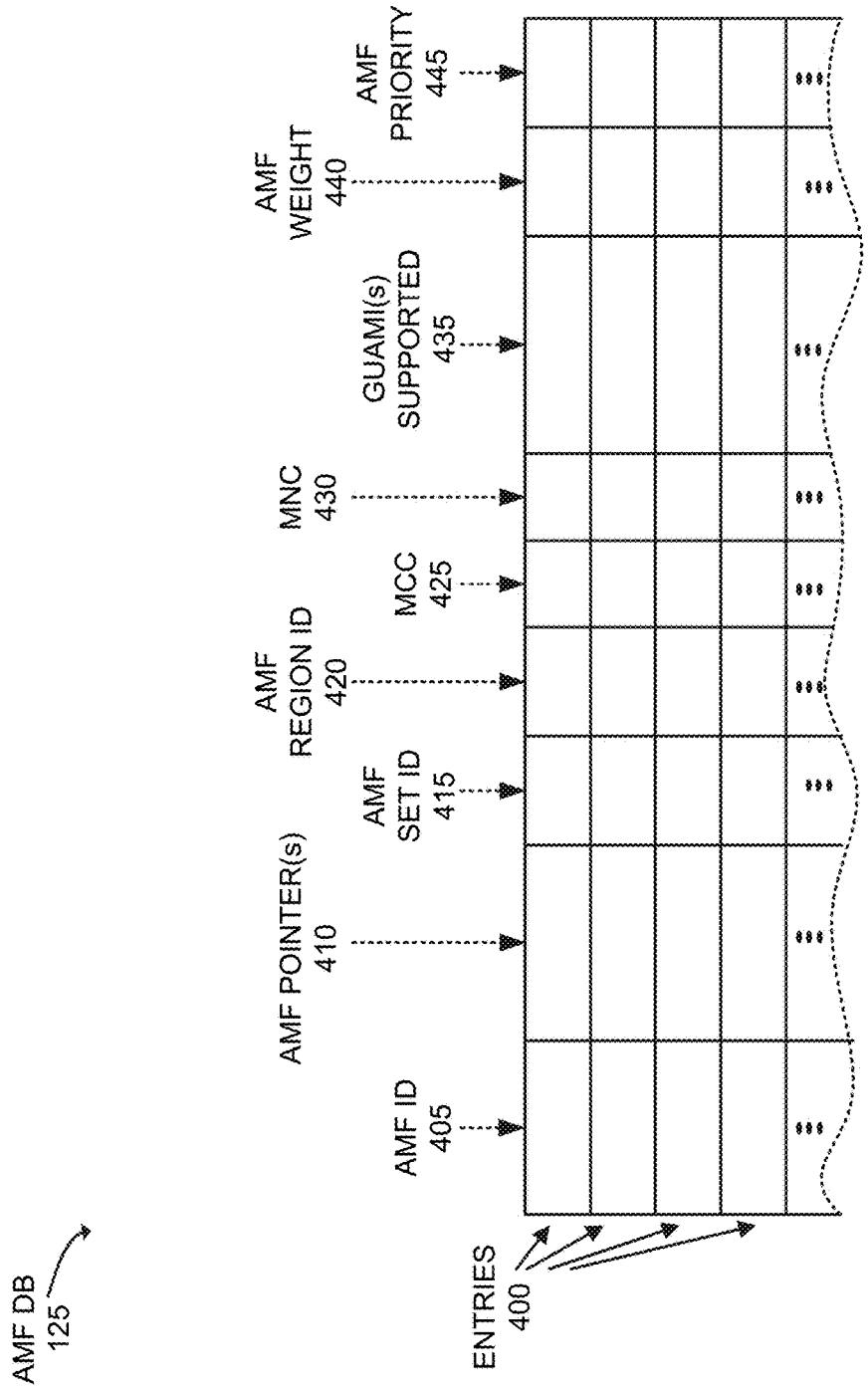
FIG. 4 is a diagram that depicts an exemplary implementation of the AMF database of FIG. 1.

FIG. 4 is a diagram that depicts an exemplary implementation of AMF DB 125. As shown, a data structure of AMF DB 125 may include multiple entries 400, with each entry 400 including an AMF identifier (ID) field 405, an AMF pointer(s) field 410, an AMF set ID field 415, an AMF region ID field 420, a Mobile Country Code (MCC) field 425, a Mobile Network Code (MNC) field 430, a Globally Unique AMF ID(s) (GUAMI(s)) supported field 435, an AMF weight field 440, and an AMF priority field 445. In one implementation, AMF DB 125 may be stored within memory of a network device 300 that is different than SRDN 120, base stations 130, or AMF supervisory node(s) 115. In another implementation, AMF DB 125 may be stored within a memory of SRDN 120. In a further implementation, a version of AMF DB 125 may be stored in a memory at each base station 130 in network(s) 110-1.

AMF identifier (ID) field 405 stores an identifier for an AMF instance 140. The unique identifier includes a single identifier associated with an AMF instance 140. The unique AMF ID stored in field 405 may be different than the identifier(s) stored in GUAMI(s) supported field 435. A given AMF instance 140 may be associated with multiple GUAMIs, but only a single AMF ID. In one implementation, the unique ID stored in field 405 may include an IP address of an AMF instance 140.

AMF pointer(s) field 410 may store one or more AMF pointers that are associated with the AMF instance 140 identified in field 405. AMF set ID field 415 stores a globally unique identifier (GUID) associated with a particular group of AMF instances. The AMF instances may be grouped based on various factors, such as network proximity, network accessibility, and/or network location. Other factors may be used to group AMF instances together within a set of AMFs.

AMF region ID field 420 stores a GUID that identifies a particular region of network 110 at which the AMF instance 140 identified in field 405 is installed. MCC field 425 stores a Mobile Country Code that identifies a particular country in which the AMF instance 140 identified in field 405 is physically located. MNC field 430 stores a Mobile Network Code that identifies a particular mobile network in which the AMF instance 140 identified in field 405 is installed. As one example, an AMF instance 140 installed in a network node located within the United States, within a network 110 operated by XYZ Communications would have MCC="US" and MNC="XYZ."

GUAMI(s) supported field 435 stores one or more GUAMIs that are supported by the AMF instance 140 identified in field 405. In one implementation, a GUAMI is defined as:

GUAMI=<MCC><MNC><AMF Region ID><AMF Set ID><AMF Pointer> where: MCC=data identifying a Mobile Country Code,
MNC=data identify a Mobile Network Code,
AMF Region ID=data identifying a particular region of a network 110,
AMF Set ID=data identifying a particular group of AMF instances 140,
AMF Pointer=a pointer value that points to one or more AMF instances 140 within AMF DB 125.

AMF weight field 440 stores a weight value for the AMF instance 140 identified by field 405, where the weight value may be used as a basis for selecting the AMF instance 140, among other AMF instances, for, for example, load balancing. The weight value may be derived based on various network performance parameters associated with the AMF instance 140 identified in field 405. Such network performance parameters may include, but are not limited to, latency, bandwidth, throughput, processing power, memory capacity, etc. AMF priority field 445 stores a priority value for the AMF instance 140 identified by field 405, where the priority value may be used as a basis for selecting the AMF instance 140, among other AMF instances, for handling particular types of UEs, particular types of UE traffic, etc.

To locate a particular entry of AMF DB 125, DB 125 may be indexed with, for example, an AMF ID to locate an entry 400 having a matching AMF ID field 405. When such an entry 400 is located, data may be stored in one or more fields 410, 415, 420, 425, 430, 435, 440, and/or 445, data may be retrieved from one or more fields 410, 415, 420, 425, 430, 435, 440, and/or 445, of the entry 400. Other fields of an entry 400, instead of AMF ID 405, may alternatively be used for indexing AMF DB 125. For example, AMF instances 140 within entries 400 of AMF DB 125 may be identified by matching an AMF pointer retrieved from a GUAMI, for example, and matching the retrieved AMF pointer with AMF pointers stored within the fields 410 of entries of AMF DB 125. When one or more entries 400 are identified having an AMF pointer value stored in field 410 that matches an AMF pointer extracted from a GUAMI, the AMF instance 140 stored in field 405 of each of the entries 400 may be determined to be a target AMF instance for purposes of performing access control functions and/or mobility management functions for a UE 105 which originated the GUAMI as part of a service request. After locating the one or more entries 400 having an AMF pointer value stored in field 410 that matches an AMF pointer extracted from the GUAMI, the AMF weight stored in field 440 and/or the AMF priority stored in field 445, may be retrieved from each of the located one or more entries 400 to be used for, for example, selecting among multiple target AMF instances.

AMF DB 125 is depicted in FIG. 4 as including a tabular data structure with a certain number of fields having certain content. The tabular data structure of DB 125 shown in FIG. 4, however, is for illustrative purposes. Other types of data structures may alternatively be used. The number, types, and content of the entries and/or fields in the data structure of DB 125 illustrated in FIG. 4 is also for illustrative purposes. Other data structures having different numbers of, types of and/or content of, the entries and/or the fields may be implemented. Therefore, AMF DB 125 may include additional, fewer and/or different entries and/or fields than those depicted in FIG. 4.

Figure 5:
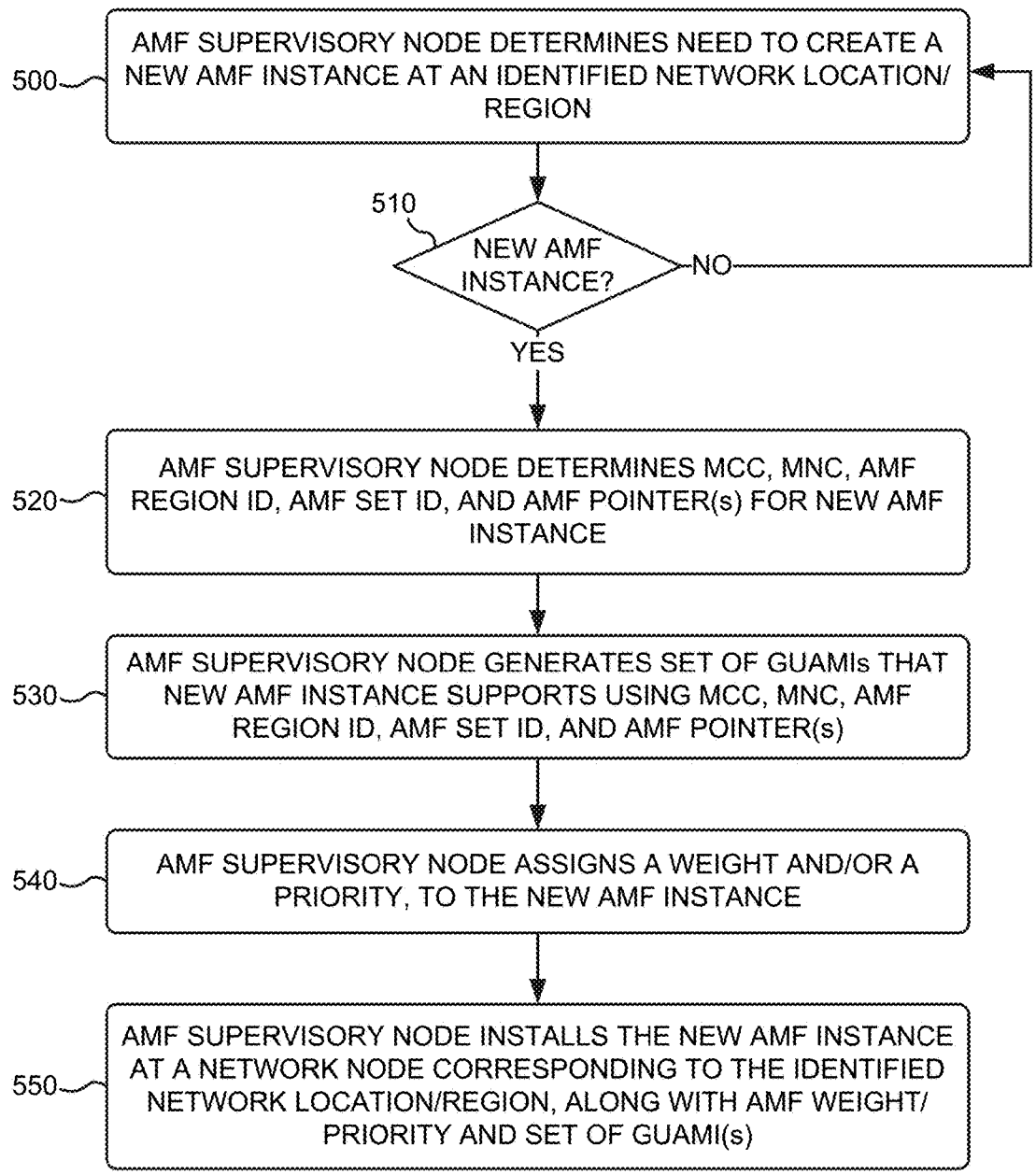
FIG. 5 is a flow diagram that illustrates an exemplary process for installing a new AMF instance within the networks of FIG. 1.

FIG. 5 is a flow diagram that illustrates an exemplary process for installing a new AMF instance 140 within networks 110. The exemplary process of FIG. 5 may be implemented by processing unit 315 of AMF supervisory node(s) 115. The exemplary process of FIG. 5 is described with reference to the messaging/operation diagram of FIG. 6.

Figure 6:
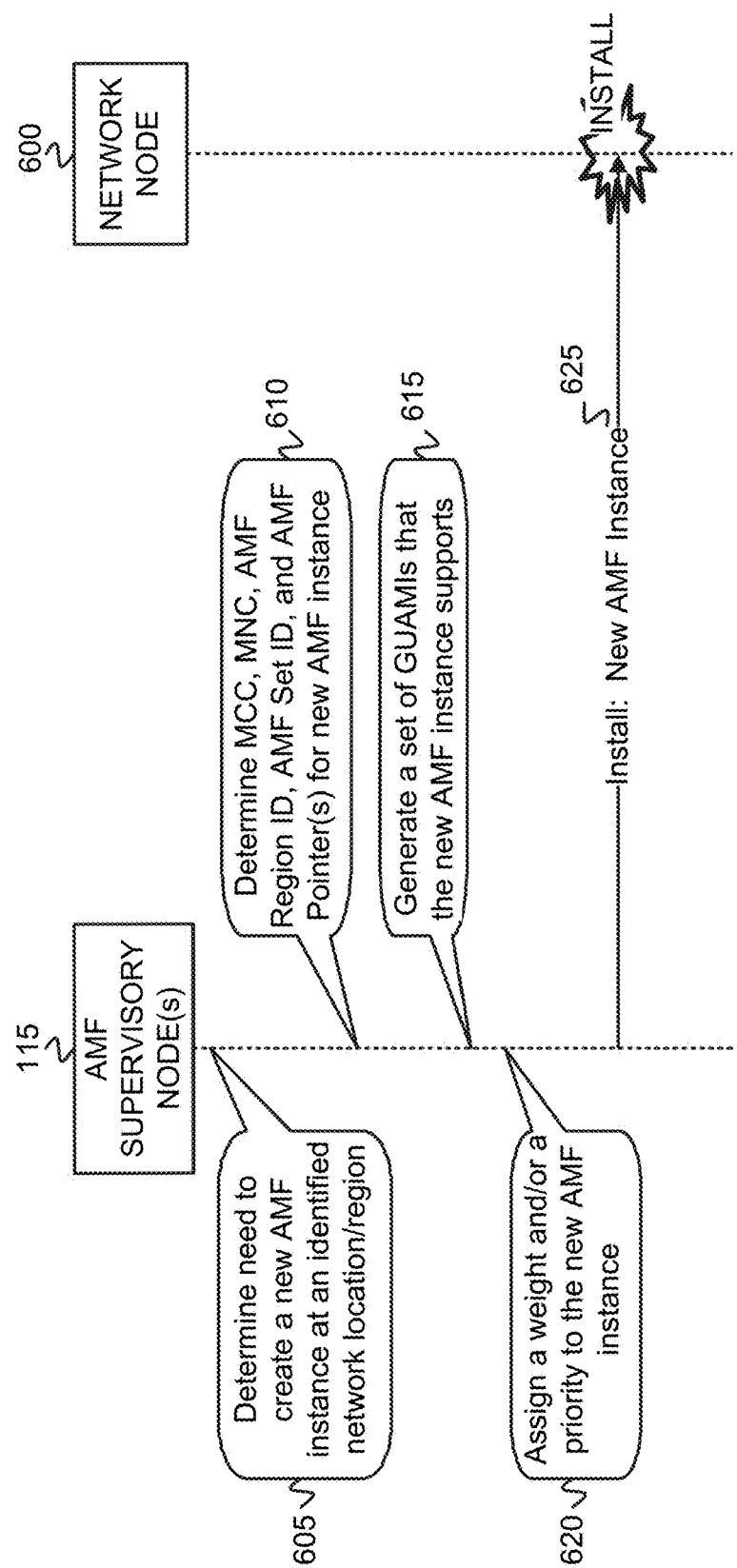
FIG. 6 is an exemplary messaging and operation diagram associated with the process of FIG. 5.

The exemplary process includes AMF supervisory node(s) 115 determining a need to create a new AMF instance at an identified network location or region (block 500). AMF supervisory node(s) 115 may keep a record of the failures of existing AMFs, planned maintenance activities involving existing AMFs, existing or predicted traffic growth possibly necessitating new AMFs, and the creation of new network "slices" within network(s) 110. Information related to failures of existing AMFs, planned maintenance activities, existing or predicted traffic growth, and the creation of new network slices may be manually provided to AMF supervisory node(s) 115, and/or may be automatically reported from various nodes within networks 110. The network location or region at which the new AMF instance is to be installed may also be determined based on various factors, such as, for example, planned maintenance activities at particular network locations or regions, and/or existing or predicted traffic growth within particular network locations or regions. FIG. 6 depicts AMF supervisory node(s) 115 determining 605 the need to create a new AMF instance at an identified network location/region.

If a new AMF instance 140 is not needed (NO—block 510), then the exemplary process may repeat block 500. If a new AMF instance 140 is determined to be needed (YES—block 510), then AMF supervisory node(s) 115 determines an MCC, MNC, AMF region ID, AMF set ID, and AMF pointer(s) for the new AMF instance (block 520). AMF supervisory node(s) 115 may determine the MCC, MNC and AMF region ID based on the network location or region of the particular network 110 that was identified in block 500. AMF supervisory node(s) 115 may group the new AMF instance 140 with one or more other AMF instances 140 already installed within networks 110 based on various factors, such as, for example, network proximity, network accessibility, network location, and/or a context sharing model. Other factors may be used to group the new AMF instance 140 together within a set of AMFs. To determine one or more AMF pointers for the new AMF instance 140, AMF supervisory node(s) 115 may select from existing AMF pointers already associated with existing, installed AMF instances 140, or may create one or more new AMF pointers to associate with the new AMF instance 140. Each AMF pointer, in a context sharing model, corresponds to a context sharing domain, such as a shared database, partition, or an active replication of information across all corresponding AMFs of that pointer. Therefore, each AMF assigned to an AMF pointer has access, via the context sharing domain, to UE context information for that AMF pointer such that, when a transaction for a UE is sent to the AMF, that AMF should be able to retrieve the UE context via the context sharing domain. AMF pointers may be allocated to AMFs based on the respective content sharing domains associated with each AMF pointer. FIG. 6 depicts AMF supervisory node(s) 115 determining 610 a MCC, MNC, AMF region ID, AMF set ID, and AMF pointer(s) for the new AMF instance 140.

AMF supervisory node(s) 115 generates a set of GUAMI(s) that the new AMF instance supports using the MCC, MNC, AMF region ID, AMF set ID, and AMF pointer(s) (block 530). In one implementation, AMF supervisory node(s) 115 may concatenate the MCC, MNC, AMF region ID, AMF set ID, and AMF pointer (determined in block 520) to one another to create each GUAMI that the new AMF instance supports. The following is one example of a concatenated GUAMI:

GUAMI=<MCC><MNC><AMF Region ID><AMF Set ID><AMF Pointer>

Therefore, for each AMF pointer that is associated with the new AMF instance 140, a different GUAMI may be created such that the new AMF instance 140 supports one or more GUAMIs (i.e., multiple AMF pointers results in a corresponding number of GUAMIs). FIG. 6 depicts AMF supervisory node(s) 115 generating 615 a set of GUAMIs that the new AMF instance 140 supports.

AMF supervisory node(s) 115 assigns a weight and/or a priority, to the new AMF instance (block 540). The weight to be assigned to the new AMF instance 140 may be derived based on, for example, various network performance parameters associated with the new AMF instance 140. Such network performance parameters may include, but are not limited to, latency, bandwidth, throughput, processing power, memory capacity, etc., associated with the network device and/or network location or region at which the new AMF instance 140 is to be installed. The priority value to be assigned to the new AMF instance 140 may be derived based on various factors associated with the new AMF instance, the network device at which the new AMF instance 140 is to be installed, and/or the network location or region of the network device at which the new AMF instance 140 is to be installed. The various factors may include what particular UEs the new AMF instance 140 may handle (e.g., UEs having high data usage), the particular types of UE traffic the new AMF instance 140 may handle (audio calls, data traffic, Short Message Service (SMS) texts), the degree of UE mobility, the type of UE, the frequency of state changes at a UE, etc. FIG. 6 depicts AMF supervisory node(s) 115 assigning 620 a weight and/or a priority to the new AMF instance 140.

AMF supervisory node(s) 115 installs the new AMF instance at a network device/node corresponding to the identified network location/region, along with the AMF weight/priority and the set of GUAMI(s) (block 550). To install the new AMF instance, AMF supervisory node(s) 115 may upload the new AMF instance 140, the AMF weight/priority, and the set of GUAMIs for storage in a memory of the network device/node within network 110 at which the new AMF is being installed. Subsequent to installation at the network device/node, a processing unit 315 of the network device/node may retrieve the AMF instance 140 from memory (e.g., main memory 320) and execute the AMF instance 140 to bring it to an operational and available status. During execution, the installed AMF instance 140 may retrieve and use the AMF weight/priority, and the set of GUAMIs, stored in memory. When the AMF instance 140 first executes, then the exemplary process detailed below with respect to FIGS. 7 and 8 may be implemented to perform a registration of the new AMF instance 140. FIG. 6 depicts AMF supervisory node(s) 115 installing 625 the new AMF instance 140 at network node 600.

The exemplary process of FIG. 5 may be executed continuously (e.g., as a background process at AMF supervisory node(s) 115), periodically based on a timer value (e.g., every 30 minutes), or at the occurrence of one or more particular events (e.g., the occurrence of a failure of an existing AMF 140).

Figure 7:
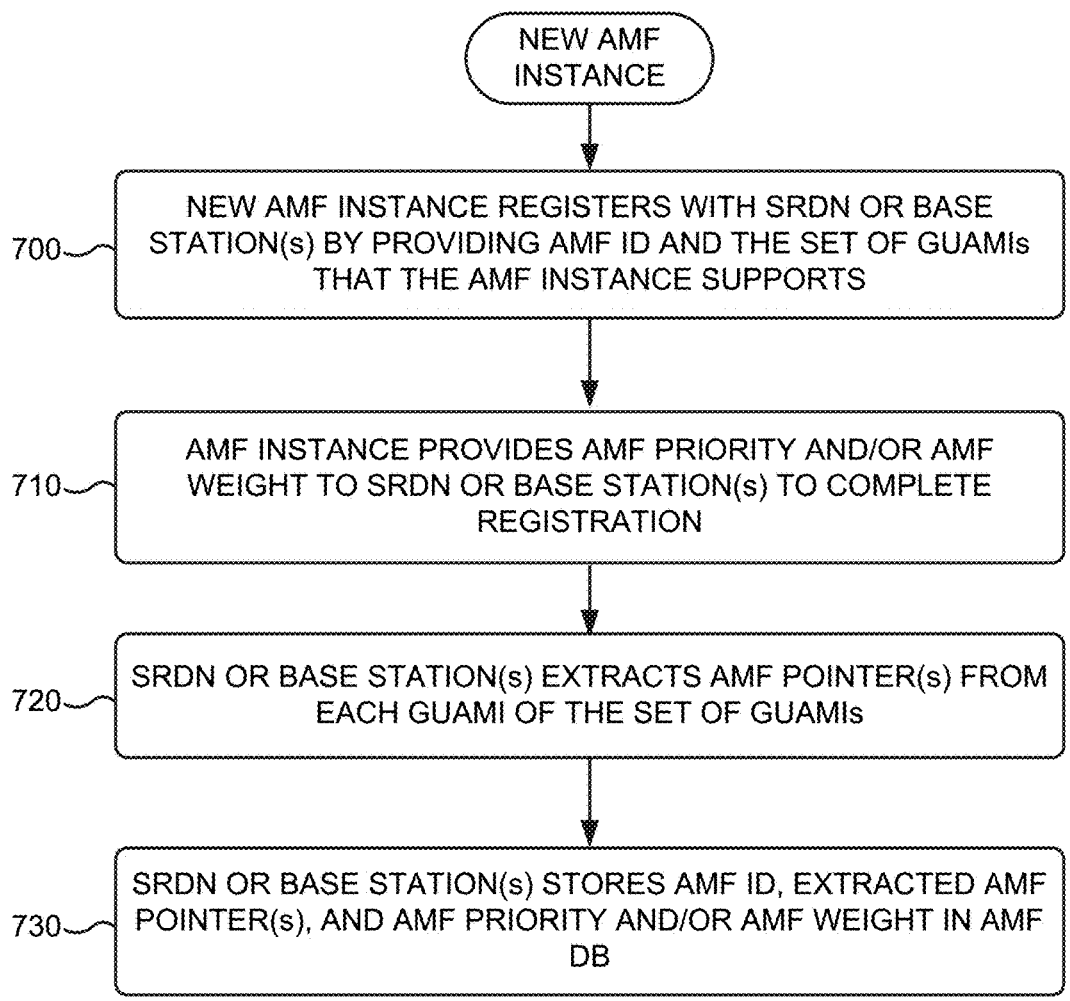
FIG. 7 is a flow diagram illustrating an exemplary process for registering a new AMF instance installed at a network node/network device within the networks of FIG. 1.

FIG. 7 is a flow diagram illustrating an exemplary process for registering a new AMF instance installed at a network node/network device within networks 110. The exemplary process of FIG. 7 may be implemented by an AMF instance 140, in conjunction with SRDN 120 and/or a base station(s) 130. The exemplary process of FIG. 7 is described with reference to the exemplary operation/messaging diagram of FIG. 8. The exemplary process of FIG. 7 may occur subsequent to installation of a new AMF instance 140 at a network node/network device, as described above with respect to FIGS. 5 and 6. The signaling shown in operation/messaging diagrams, such as FIG. 8, may on the control plane (NAS) or a next generation control plane protocol, and control plane messages may be used to carry the data, as described herein.

The exemplary process includes the new AMF instance 140 registering with SRDN 120 or a base station(s) 130 by providing its AMF ID and the set of GUAMIs that the AMF instance supports (block 700). The AMF instance also provides an AMF priority and/or AMF weight to SRDN 120 or the base station(s) 130 to complete the registration (block 710). The AMF ID, the set of GUAMIs, and the AMF priority/weight may have been stored in memory at the time that the AMF instance 140 was installed, as described in block 550 of FIG. 5. Referring to the operation/messaging diagram of FIG. 8, new AMF instance 140 sends a message 800 that includes an AMF ID, and a set of GUAMIs supported by AMF instance 140. New AMF instance 140 additionally sends 805 an AMF priority and/or AMF weight that is assigned to the new AMF instance 140. The new AMF instance 140 may send the AMF priority and/or AMF weight in a same message as the AMF ID and the set of GUAMIs, or in a separate message.

Figure 8:
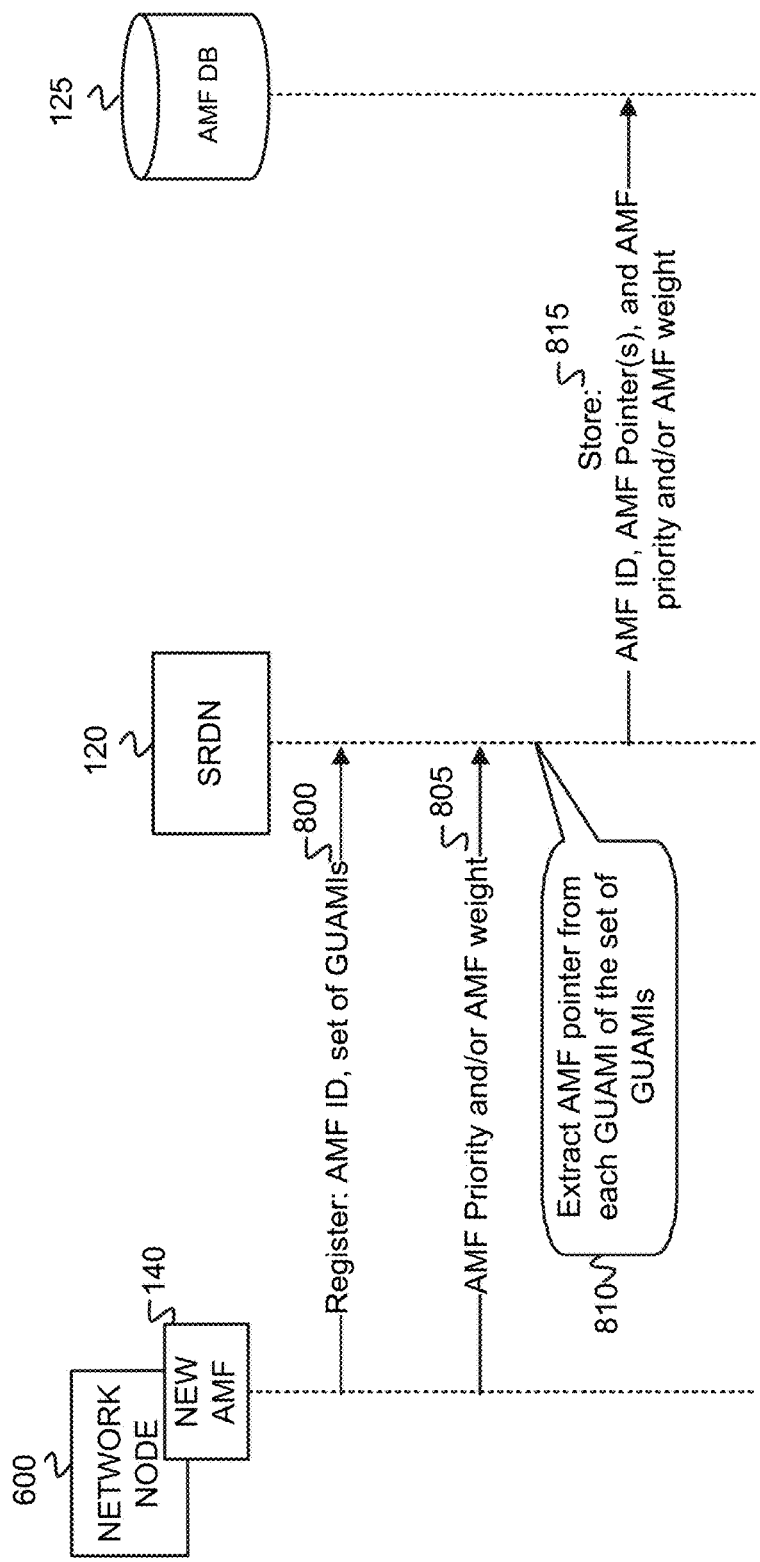
FIG. 8 is an exemplary messaging and operation diagram associated with the process of FIG. 7.

SRDN 120 or base station(s) 130 extracts an AMF pointer(s) from each GUAMI of the set of GUAMIs (block 720). In an implementation in which each GUAMI equals the concatenation of <MCC> <MNC> <AMF Region ID> <AMF Set ID> <AMF Pointer>, SRDN 120 or base station(s) 130 extracts the <AMF Pointer> from the end of the GUAMI. SRDN 120 or base station(s) 130 stores the AMF ID, extracted AMF pointer(s), and AMF priority and/or AMF weight in an entry 400 of AMF DB 125 (block 730). For example, SRDN 120 or base station(s) 130 stores, in an entry 400 of AMF DB 125, the AMF ID in field 405, the AMF pointer(s) in field 410, the AMF weight in field 440, and the AMF priority in field 445. SRDN 120 or base station(s) 130 additionally stores the set of GUAMIs within GUAMI(s) supported field 435 of the same entry 400 of AMF DB 125. FIG. 8 depicts SRDN 120 extracting 810 the AMF pointer from each GUAMI of the set of GUAMIs, and SRDN 120 storing 815 the AMF ID, AMF pointer(s), and AMF priority and/or AMF weight in AMF DB 125.

The exemplary process of FIG. 7 may be repeated by each new AMF instance 140 that completes installation at a network node/network device of networks 110.

Figure 9:
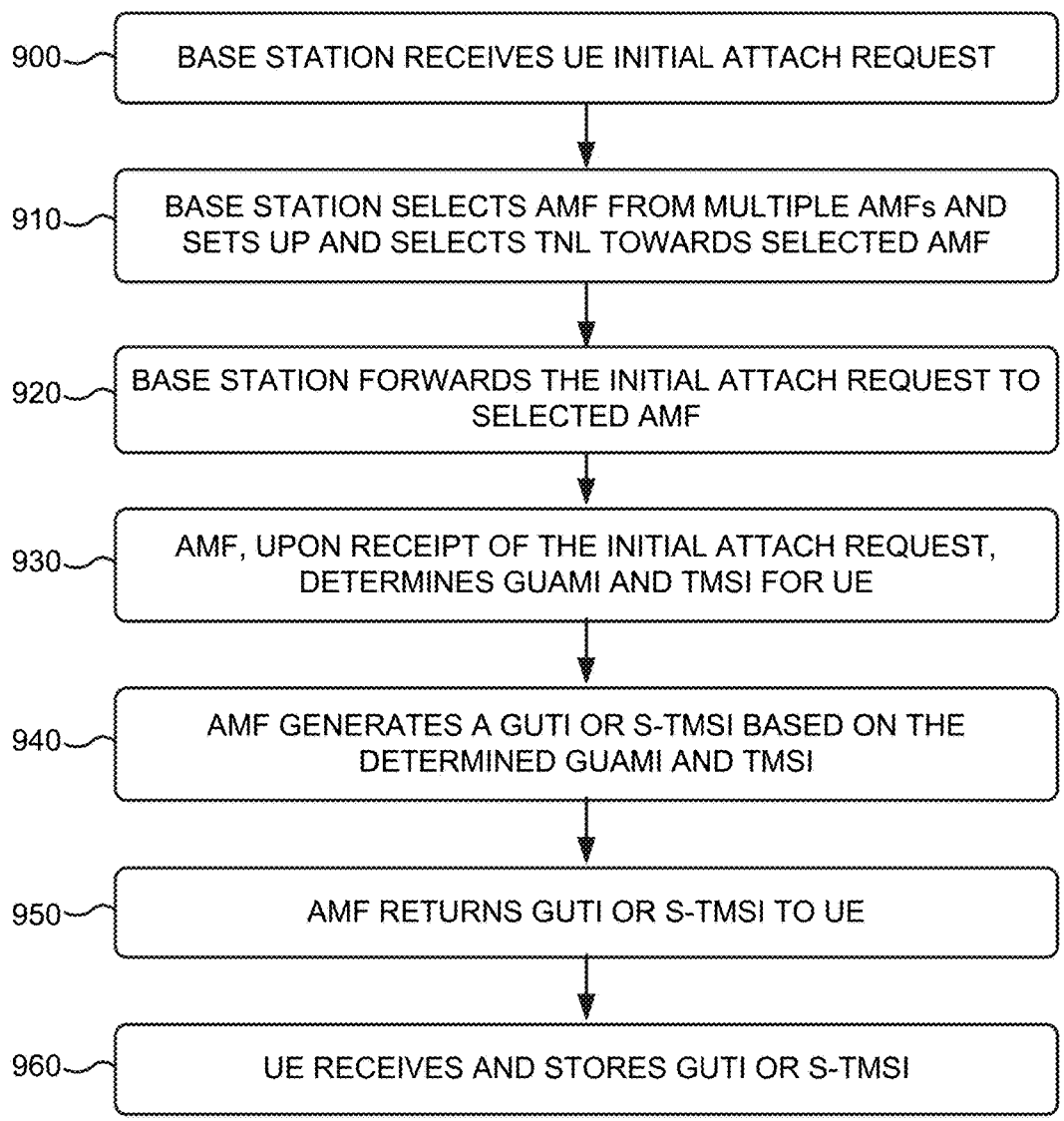
FIG. 9 is a flow diagram illustrating an exemplary process for receiving and processing an initial user equipment attach request.

FIG. 9 is a flow diagram illustrating an exemplary process for receiving and processing an initial UE attach request from a UE 105. The exemplary process of FIG. 9 may be implemented by a base station 130, in conjunction with a UE 105 and an AMF instance 140. The exemplary process of FIG. 9 is described with reference to the operation/messaging diagram of FIG. 10.

Figure 10:
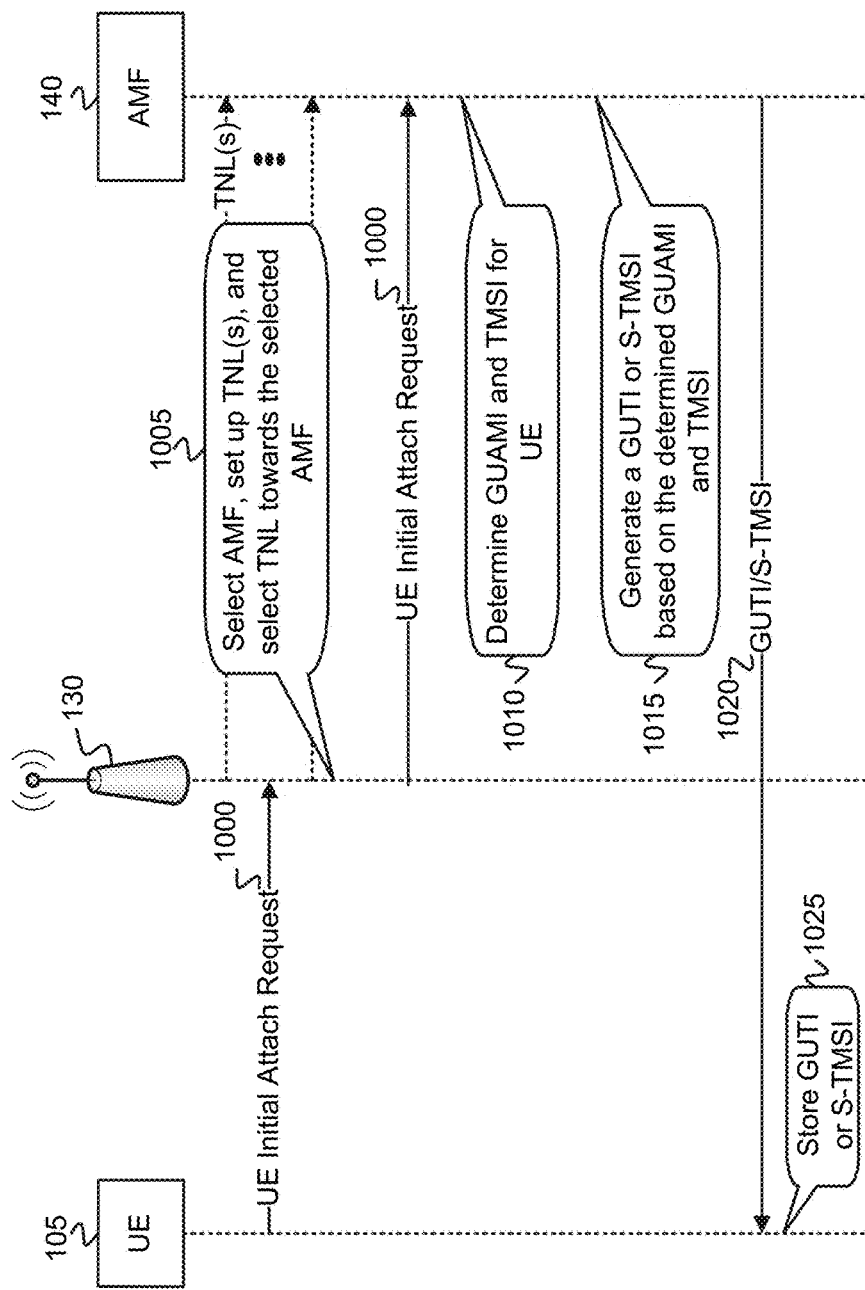
FIG. 10 is an exemplary messaging and operation diagram associated with the process of FIG. 9.

The exemplary process includes base station 130 receiving a UE initial attach request (block 900). The UE 105, that is attempting to connect to wireless network 110-1, sends a UE initial attach request to the base station(s) 130 that is/are serving UE 105 to request access to network(s) 110-1. FIG. 10 depicts UE 105 sending a UE initial attach request 1000 to base station 130. Base station 130, upon receipt of the UE initial attach request, selects an AMF from multiple AMFs and sets up and selects a TNL connection towards the selected AMF (block 910). Various techniques and/or algorithms may be used for selecting the AMF instance 140 that will handle network access and/or mobility management functions on behalf of the UE 105 that sent the initial attach request. An exemplary technique for selecting the AMF instance 140 is described in further detail below with respect to FIGS. 11A-11B and FIG. 12. Selection of an AMF from the multiple AMFs, as described below with respect to FIGS. 11A-11B, includes assigning an AMF pointer to the selected AMF instance 140, and storing the AMF pointer in field 410 of the AMF instance 140's entry 400 in AMF DB 125. FIG. 10 depicts base station 130 selecting 1005 an AMF instance 140 from multiple AMF instances, setting up one or more TNL connections to the selected AMF instance 140, and selecting one of the TNL connections towards the selected AMF instance 140. Base station 130 forwards the initial attach request to the selected AMF (block 920). As shown in FIG. 10, base station 130 forwards the UE initial attach request 1000 to AMF instance 140 via networks 110.

The selected AMF, upon receipt of the UE initial attach request, determines the GUAMI and a Temporary Mobile Subscriber Identity (TMSI) for the requesting UE 105 (block 930). The TMSI may include a temporary identifier that identifies the UE 105 within the wireless network 110-1. The GUAMI may include, for example, a concatenation of the MCC, MNC, AMF region ID, AMF set ID, and AMF pointer for the selected AMF 140. The AMF 140 may have the MCC, MNC, AMF region ID, AMF set ID, and AMF pointer values stored locally, or may retrieve them from AMF DB 125. FIG. 10 depicts AMF 140 determining 1010 a GUAMI and a TMSI for the UE 105 that originated the UE initial attach request.

The AMF generates a Globally Unique Temporary ID (GUTI) or a shortened TMSI (S-TMSI) based on the determined GUAMI and TMSI (block 940). To generate a GUTI, the AMF 140 may concatenate the GUAMI and the TMSI as follows:

GUTI=<GUAMI><TMSI>

The S-TMSI represents a shortened form of the GUTI that enables more efficient radio signaling procedures (e.g., during Paging and Service Request). To generate an S-TMSI, the AMF 140 may concatenate the AMF set ID, the AMF pointer, and the TMSI, as follows:

S-TMSI=<AMF SET ID><AMF POINTER><TMSI>

FIG. 10 depicts AMF 140 generating 1015 a GUTI or S-TMSI based on the determined GUAMI and TMSI.

The AMF returns the GUTI or S-TMSI to the UE 105 (block 950), and the UE 105 receives and locally stores the GUTI or S-TMSI (block 960). FIG. 10 depicts AMF 140 sending the GUTI or S-TMSI 1020 to UE 105 via base station 130. Further, as shown in FIG. 10, upon receipt of the message containing the GUTI or S-TMSI 1020, UE 105 stores 1025 the GUTI or S-TMSI in local memory for future service requests/signaling to network(s) 110-1.

The exemplary process of FIG. 9 may be repeated for each UE initial attach request received from a UE 105 at a base station 130.

Figure 11A:
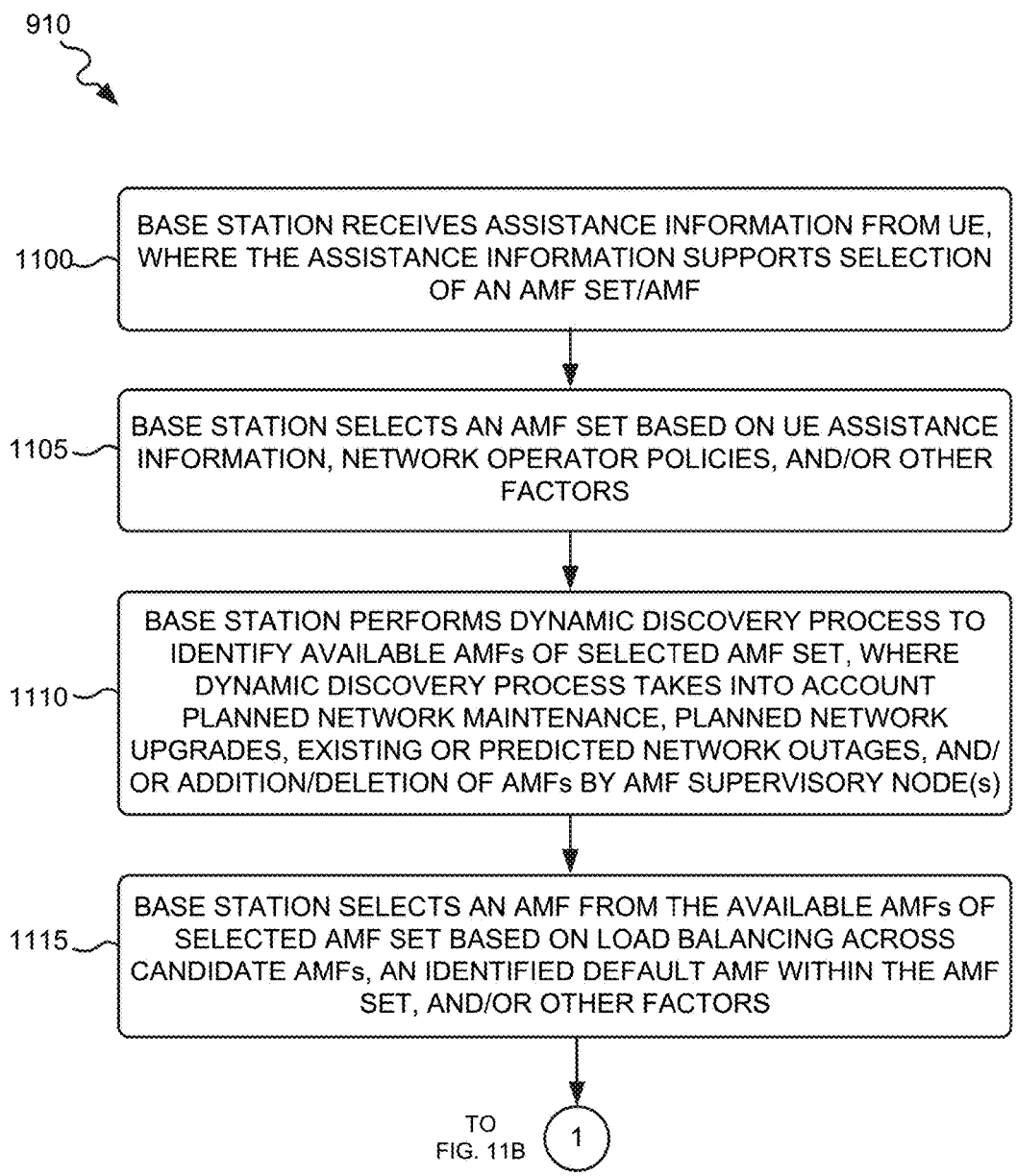
FIGS. 11A and 11B are flow diagrams illustrating an exemplary process for selecting an AMF instance from multiple AMF instances.
Figure 11B:
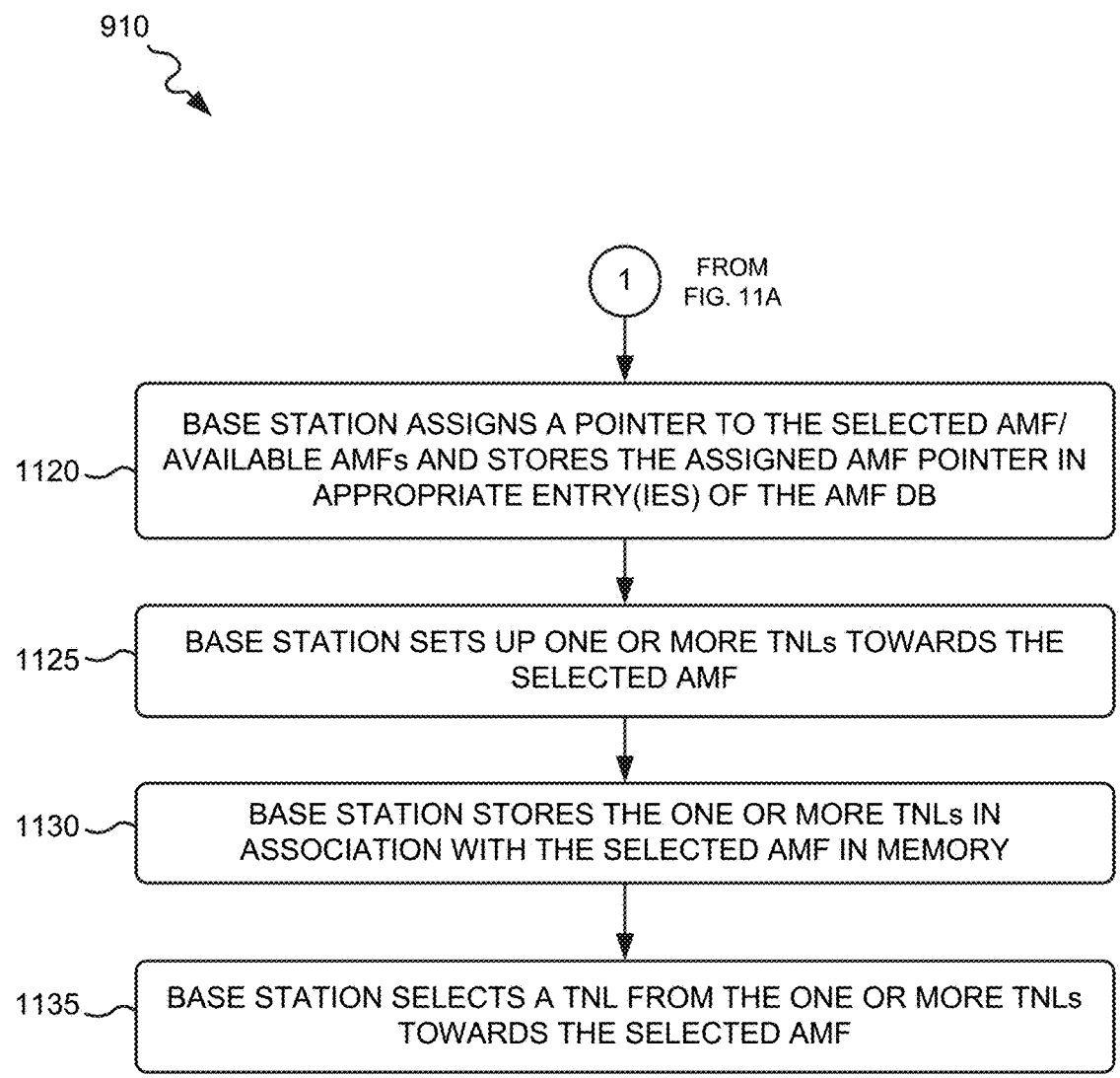

FIGS. 11A and 11B are flow diagrams illustrating an exemplary process for implementing block 910 of FIG. 9 to select an AMF instance 140 from multiple AMF instances. The exemplary process of FIGS. 11A and 11B may be implemented by a base station 130 that receives a UE initial attach request from a UE 105. The exemplary process of FIGS. 11A and 11B is described with reference to the diagram of FIG. 12.

The exemplary process includes base station 130 receiving assistance information from the UE 105, where the assistance information supports the selection of an AMF set and/or an AMF instance 140 (block 1100). Base station 130 may receive the assistance information from UE 105 within the initial attach request, or in subsequent signaling. The assistance information may include, for example, network slice selection assistance information (NSSAI). The assistance information may include other AMF selection information in addition to, or instead of, the NSSAI. A "network slice" includes a complete logical network including a Radio Access Network (RAN) and Core Network (CN) that provides certain telecommunication services and network capabilities that can vary from slice to slice. The NSSAI may provide information that permits selections of a particular network slice, and a corresponding set of AMFs that may be associated with that particular network slice.

Figure 12:
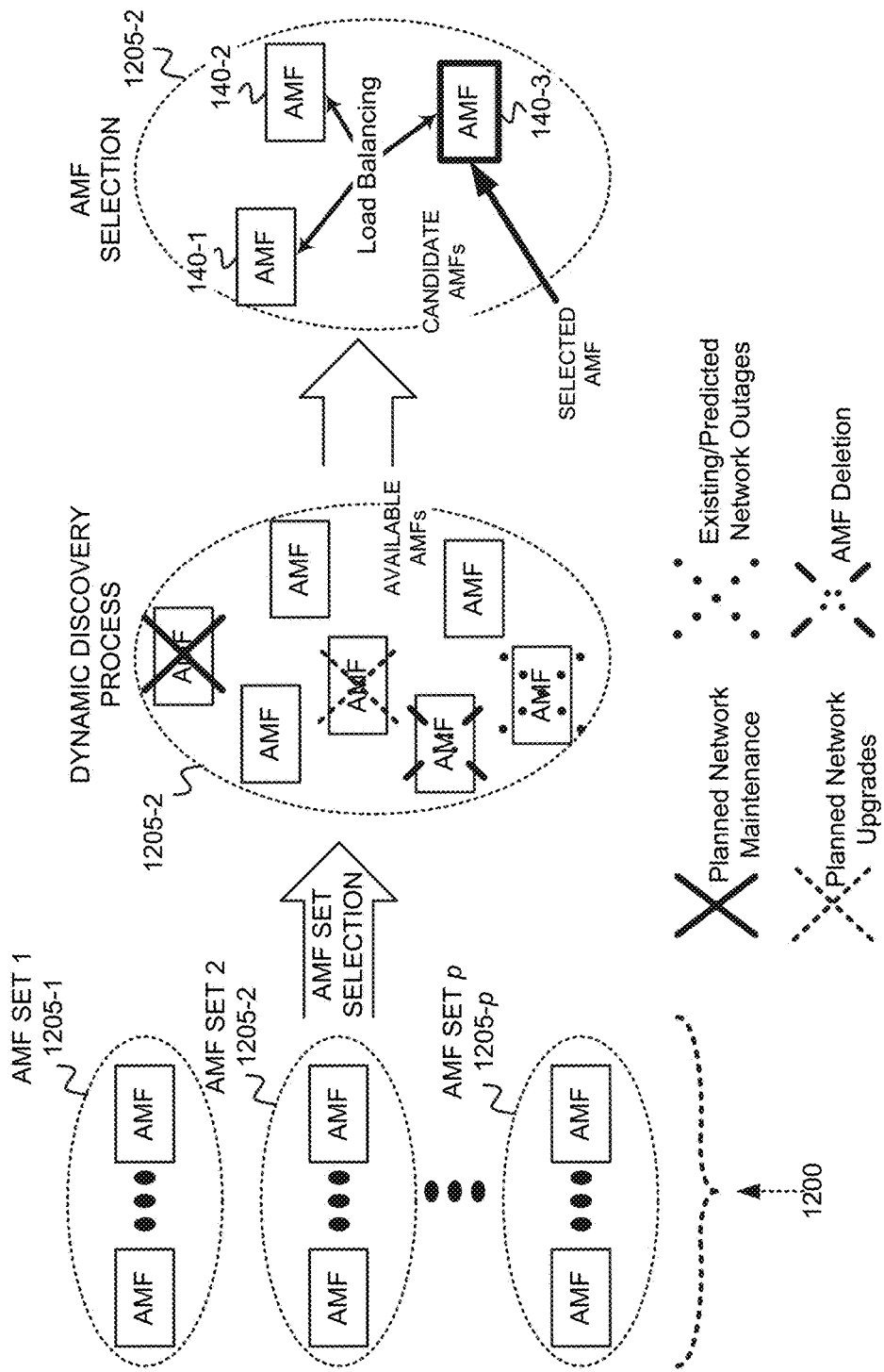
FIG. 12 is a diagram that graphically depicts the AMF selection of FIGS. 11A and 11B.

Base station 130 selects an AMF set based on the UE assistance information, network operator policies, and/or other factors (block 1105). Base station 130 may select a particular AMF set based on, among other factors, the network slice that is indicated within the NSSAI. FIG. 12 depicts an example of AMF selection from multiple AMF sets 1200. As shown, the multiple AMF sets 1200 may include AMF set 1 1205-1, AMF set 2 1205-2, . . . , and AMF setp 1205-$p$, with AMF set 1205-2 depicted as being selected from among the multiple AMF sets.

Base station 130 performs a dynamic discovery process(es) to identify available AMF instances of the selected AMF set, where the dynamic discovery process(es) takes into account planned network maintenance, planned network upgrades, existing or predicted network outages, and/or addition/deletion of AMF instances by AMF supervisory node(s) 115 (block 1110). The dynamic discovery process(es) may include the execution of one or more algorithms that take into account known events (e.g., planned maintenance, planned upgrades), keep track of existing outages or predict future outages, track additions or deletions of AMF instances from networks 110, and/or predict future AMF additions or deletions. The one or more algorithms may include a hierarchical algorithm(s), an analytic-based algorithm(s), and/or a machine learning-based algorithm(s). The dynamic discovery process(es) determines which of the multiple AMF instances 140 in the selected AMF set are currently operational and available for handling UE access functions and/or mobility management functions. Referring again to the example of FIG. 12, one AMF instance in AMF set 1205-2 is determined to be involved in planned network maintenance, one AMF instance is determined to be involved in a planned network upgrade, one AMF instance is determined to have been deleted, or is scheduled for deletion, and one AMF instance is determined to be involved in an existing or predicted network outage. The dynamic discovery process, therefore, determines that these AMF instances, crossed out within AMF set 1205-2 as shown in FIG. 12, are not available, and the remaining AMF instances are determined to be the currently available AMF instances within AMF set 1205-2. These remaining AMF instances within AMF set 1205-2 are designated as AMF targets.

Base station 130 selects an AMF instance from the available AMF instances of the selected AMF set based on load balancing across candidate AMFs, an identified default AMF with the AMF set, and/or other factors (block 1115). Base station 130 (not shown in FIG. 12) applies selection criteria to the AMF instances designated as AMF targets within the selected AMF set 1205-2. The selection criteria may include the application of loading balancing across the candidate target AMF instances (i.e., selecting an AMF instance based on the load currently being handled by that AMF instance and each of the other target AMF instances within the selected AMF set). The selection criteria may simply include selecting an identified default AMF instance from the AMF set. However, other criteria or factors, other than load balancing or default AMFs, may be used to select an AMF instance from the target AMFs. In the example of FIG. 12, load balancing is applied among the target candidate AMFs 140-1, 140-2 and 140-3 to select AMF 140-3 whose current load, in this particular example, can handle the load of an additional UE 105, and selection of AMF 140-3 balances the current load among AMFs 140-1, 140-2, and 140-3.

Base station 130 assigns a pointer to the selected AMF/ available AMFs and stores the assigned AMF pointer in an appropriate entry(ies) of AMF DB 125 (block 1120). Base station 130 may assign an existing AMF pointer to the selected AMF, or may generate a new AMF pointer and assign it to the selected AMF. Base station 130 may locate an entry 400 of AMF DB 125 having contents stored in AMF ID field 405 that match the AMF ID of the selected AMF, and may then store the assigned AMF pointer within AMF pointer(s) field 410 of the located entry 400. The assigned AMF pointer may be stored within field 410 in conjunction with one or more existing AMF pointers that are already stored in field 410.

Base station 130 sets up one or more TNL connections towards the selected AMF (block 1125). Base station 130 may use existing techniques for establishing the one or more TNL connections from base station 130 to the selected AMF instance 140 across network(s) 110. Base station 130 stores the one or more TNLs in associated with the selected AMF in memory (block 1130). Base station 130 may store, in local memory (e.g., main memory 320), the assigned AMF pointer in association with an identification of the selected AMF and information regarding the one or more TNL connections set up towards the selected AMF. The AMF pointer may subsequently be used to retrieve the information regarding the one or more TNL connections for communicating with the selected AMF via one of the one or more TNL connections. Base station 130 selects a TNL from the one or more TNLs towards the selected AMF (block 1135). The selected TNL may be used by base station 130 for subsequent communications with the selected AMF instance 140.

The blocks of the exemplary process of FIGS. 11A and 11B may be executed at each occurrence of block 910 of the process of FIG. 9.

Figure 13A:
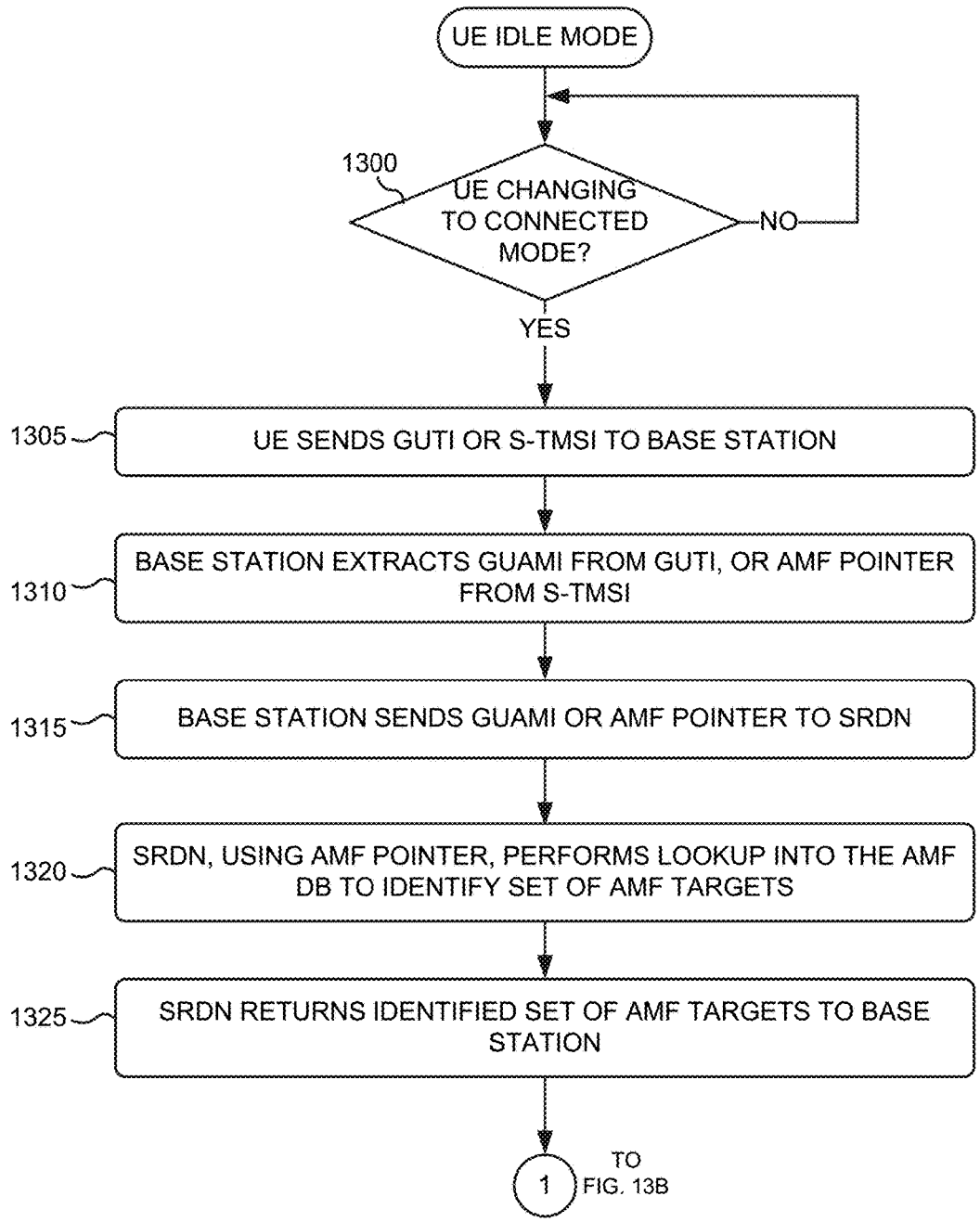
FIGS. 13A and 13B are flow diagrams illustrating an embodiment of an exemplary process for returning a user equipment to a connected state subsequent to an initial attach and the user equipment entering an idle mode.
Figure 13B:
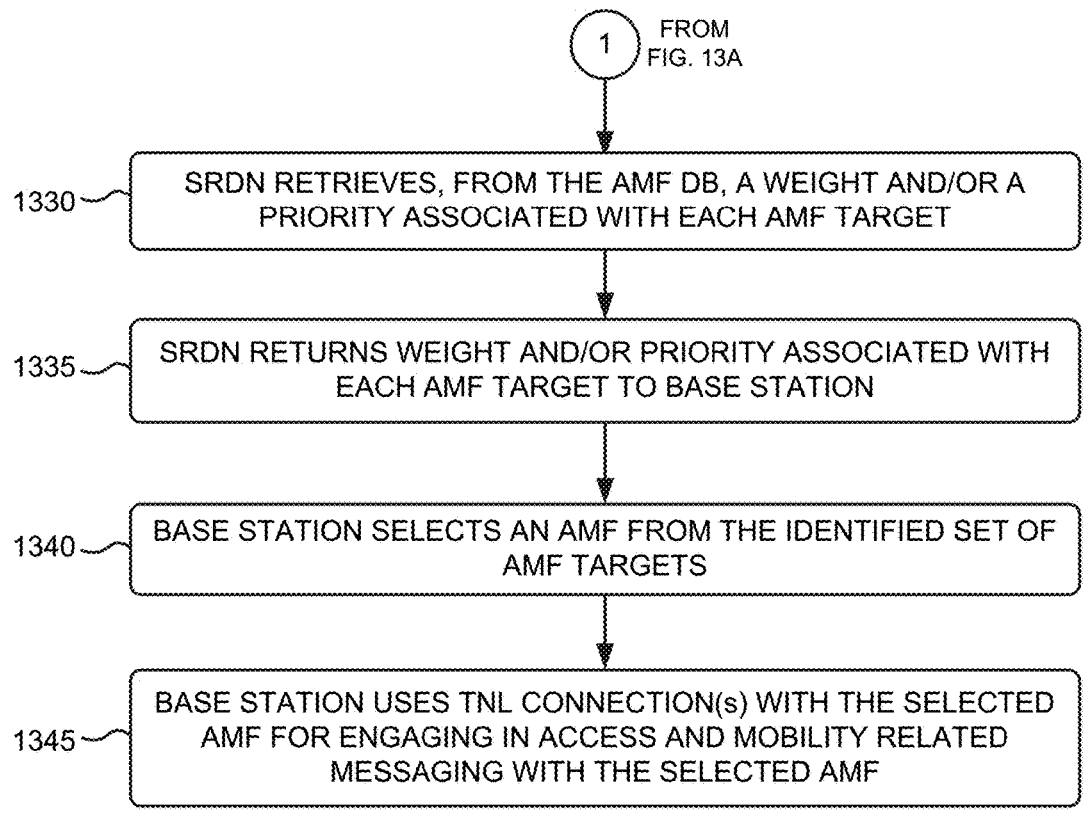

FIGS. 13A and 13B are flow diagrams illustrating an embodiment of an exemplary process for returning a UE 105 to a connected state subsequent to an initial attach and the UE entering idle mode. In this embodiment, the SRDN 120 is used to resolve the GUAMI every time the UE 105 changes to a connected mode from an idle mode. The exemplary process of FIGS. 13A and 13B may be implemented by UE 105, base station 130, and SRDN 120. The exemplary process of FIGS. 13A and 13B is described with reference to the diagrams of FIG. 14A. The exemplary process of FIGS. 13A and 13B is additionally described with respect to the simplified network environment depicted in 14B.

Figure 14A:
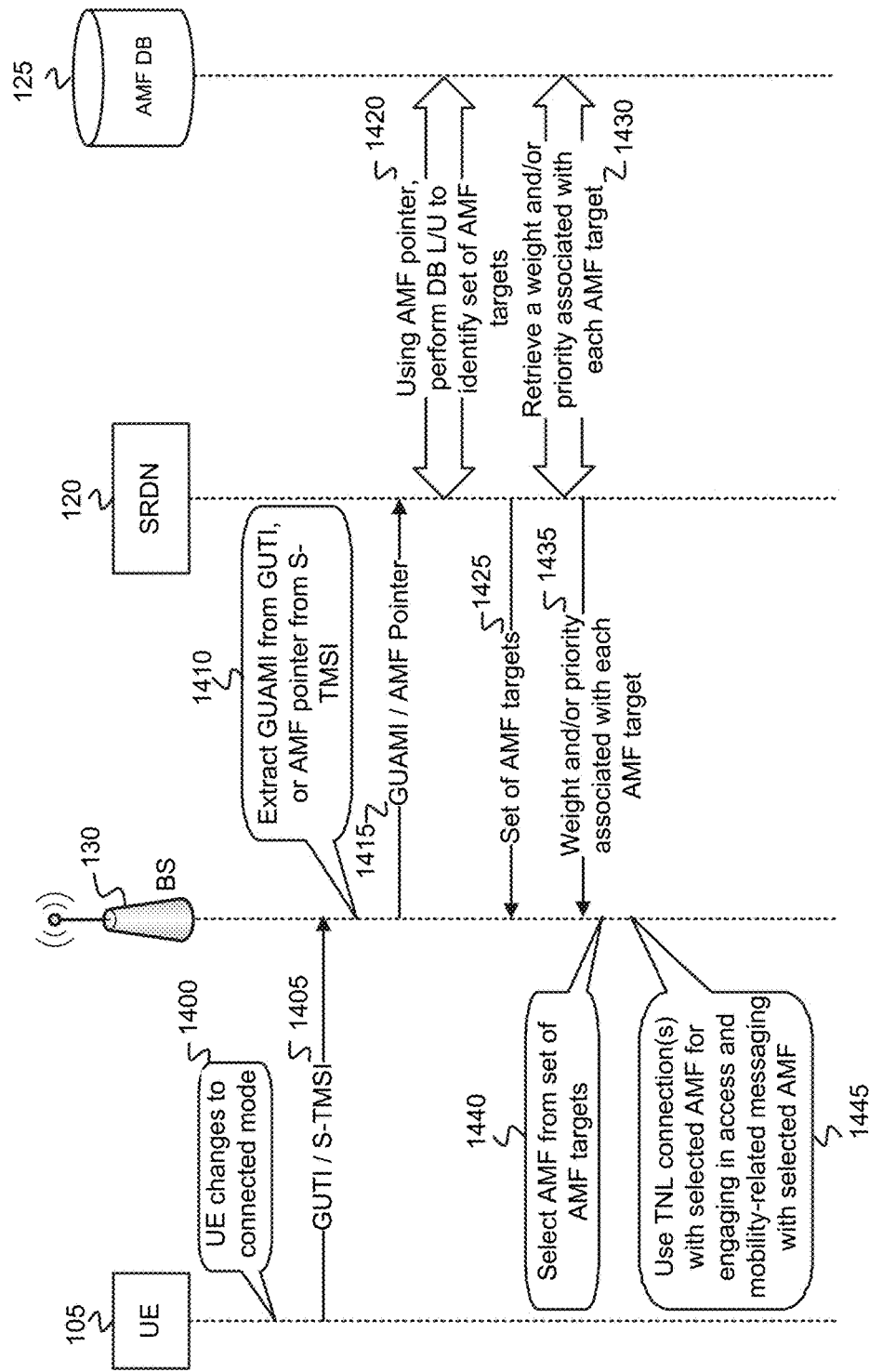
FIG. 14A is an exemplary messaging and operation diagram associated with the process of FIGS. 13A and 13B.

The exemplary process includes a determination at UE 105 whether UE 105 is changing from an idle mode to a connected mode (block 1300). A user of the UE 105 may have not used any communication functions on the UE 105 for a period of time, and the UE 105 will have entered the idle mode to, for example, conserve battery power. During the idle mode, the UE 105 may shut down one or more functions or components of UE 105, and the network(s) 110-1 may determine UE 105 to be temporarily disconnected until the UE 105 sends a GUTI or S-TMSI to a base station 130 of network(s) 110-1 indicating that it is returning to a connected mode. If the UE 105 continues in idle mode (NO—block 1300), then block 1300 may be repeat. If the UE 105 is determined to be changing to a connected mode (YES—block 1300), then UE 105 sends a GUTI or S-TMSI to a base station 130 that is currently serving the UE 105 (block 1305). FIG. 14A depicts UE 105 changing 1400 from idle mode to a connected mode, and sending a GUTI/S-TMSI 1405 to base station 130.

Figure 14B:
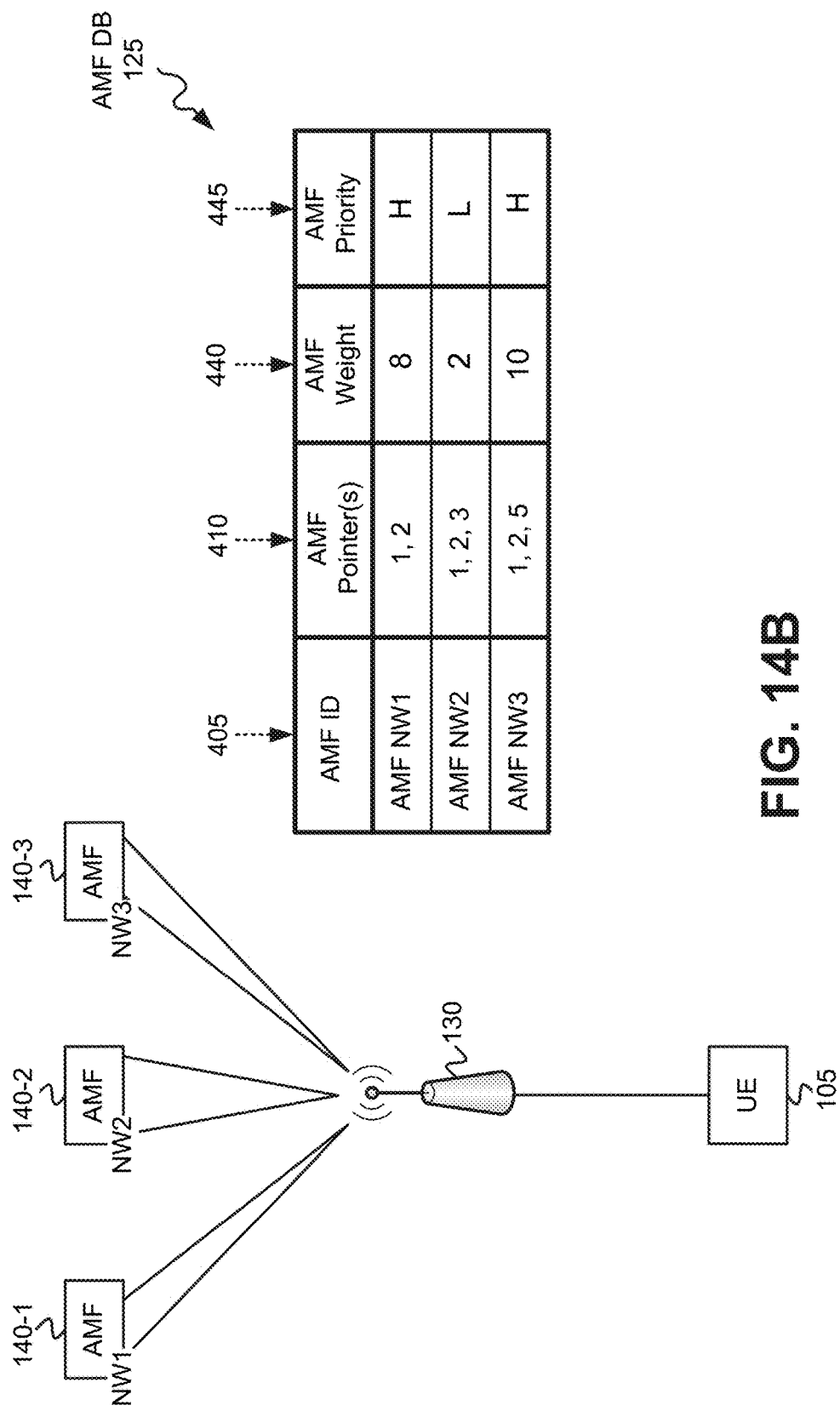
FIG. 14B depicts a simplified version of the network environment of FIG. 1 in which the exemplary process of FIGS. 13A and 13B is implemented.

Base station 130, upon receipt, extracts the GUAMI from the GUTI, or the AMF pointer from the S-TMSI (block 1310) and sends the extracted GUAMI or AMF pointer to SRDN 120 (block 1315). FIG. 14A depicts base station 130 extracting 1410 the GUAMI from the GUTI, or the AMF pointer from the S-TMSI, and sending the GUAMI/AMF pointer 1415 to SRDN 120. Upon receipt of the GUAMI from base station 130, SRDN 120 may extract the AMF pointer from the GUAMI. SRDN 120, using the AMF pointer, performs a lookup into AMF DB 125 to identify a set of AMF targets (block 1320), and returns the identified set of AMF targets to base station 130 (block 1325). SRDN 120 performs a look-up into AMF DB 125 to identify every entry 400 having at least one AMF pointer value in fields 410 that matches the AMF pointer received from base station 130, or retrieved from the GUAMI received from the base station 130. For every entry 400 having the matching AMF pointer in field 410, SRDN 120 retrieves an AMF ID value from each AMF ID field 405 to identify the set of AMF targets. FIG. 14A depicts SRDN 120 performing a DB look-up 1420 in AMF DB 125, using an AMF pointer, to identify the set of AMF targets, and sending a message 1425 to base station 130 that includes the identified set of AMF targets. As depicted in FIG. 14B, the simplified network environment may include AMF 140-1, AMF 140-2, and AMF 140-3, having respective AMF IDs of NW1, NW2, and NW3. In one example, the AMF pointer may be a value of 2, and performing a look-up into the simplified AMF DB 125 shown in FIG. 14B, the AMF pointer value of 2 matches values in AMF pointer(s) fields 410 for each of the entries in AMF DB 125. Therefore, the look-up will return AMFs NW1, NW2 and NW3 as the identified set of AMF targets in this simplified example.

SRDN 120 retrieves, from the AMF DB 125, a weight and/or a priority associated with each AMF target (block 1330), and returns the weight and/or priority associated with each AMF target to base station 130 (block 1335). For every entry 400 identified having at least one AMF pointer in fields 410 that matches the AMF pointer received from base station 130, or retrieved from the GUAMI received from the base station 130, SRDN 120 additionally retrieves a weight value from AMF weight field 440, and/or a priority value from AMF priority field 445 for each of the entries 400. FIG. 14A depicts SRDN 120 retrieving 1430 a weight and/or a priority, associated with each AMF target of the set of AMF targets, from AMF DB 125, and sending a message 1435 that includes the retrieved weight(s) and/or priority(ies) to base station 130. Returning to the simplified example of FIG. 14B, with the identified set of AMF targets including AMFs NW1, NW2 and NW3, an AMF weight of 8 and an AMF priority of "H" are retrieved for AMF NW1, an AMF weight of 2 and an AMF priority of "L" are retrieved for AMF NW2, and an AMF weight of 10 and an AMF priority of "H" are retrieved for AMF NW3 from AMF DB 125.

Base station 130 selects an AMF from the identified set of AMF targets based on the weights and/or priority (block 1340), and then uses a TNL connection(s) with the selected AMF for engaging in access and mobility related messaging with the selected AMF (block 1345). Base station 130 may, for example, select the AMF target with the highest priority value. In a situation where two or more AMF targets have the same, highest priority value, then base station 130 may compare the AMF weights of each of the AMF targets and select the AMF having the highest weight value. For example, in the simplified network environment of FIG. 14B, since NW1 and NW2 both have high (H) priorities, but NW1 has an AMF weight of 8, and NW3 has an AMF weight of 10, then AMF NW3 is would be selected. In a case where SRDN 120 only sends an AMF weight value for each AMF target, then base station 130 may compare the AMF weights to identify which AMF weight is the highest weight value. For example, referring to the simplified network environment of FIG. 14B, since NW1 has an AMF weight of 8, NW2 has an AMF weight of 2, and NW3 has an AMF weight of 10, then a comparison indicates that AMF NW3 has the highest weight value and would, therefore, be selected. In a case where SRDN 120 only sends an AMF priority value for each AMF target, then base station 130 may compare the AMF priorities to identify which AMF priority is the highest priority value. If more than one AMF have a same, but highest, priority value, than selection of an AMF from the multiple AMFs may use, for example, load balancing techniques.

If a TNL connection has been previously set up between the base station 130 and the selected AMF, then that TNL connection may be used for further communications with the selected AMF 140. If a TNL connection has not been previously set up between the base station 130 and the selected AMF, then base station 130 may set up one or more TNL connections with the selected AMF 140, such as described above with respect to blocks 1125, 1130, and 1135 of FIG. 11B. FIG. 14A depicts base station 130 selecting 1440 an AMF from the set of AMF targets, and using 1445 a TNL connection(s) with the selected AMF for engaging in access and mobility-related messaging with the selected AMF.

The blocks of the exemplary process of FIGS. 13A and 13B may be executed subsequent to an initial attach of a UE 105 to the wireless network of network(s) 110-1, and after the UE 105 enters an idle mode.

Figure 15A:
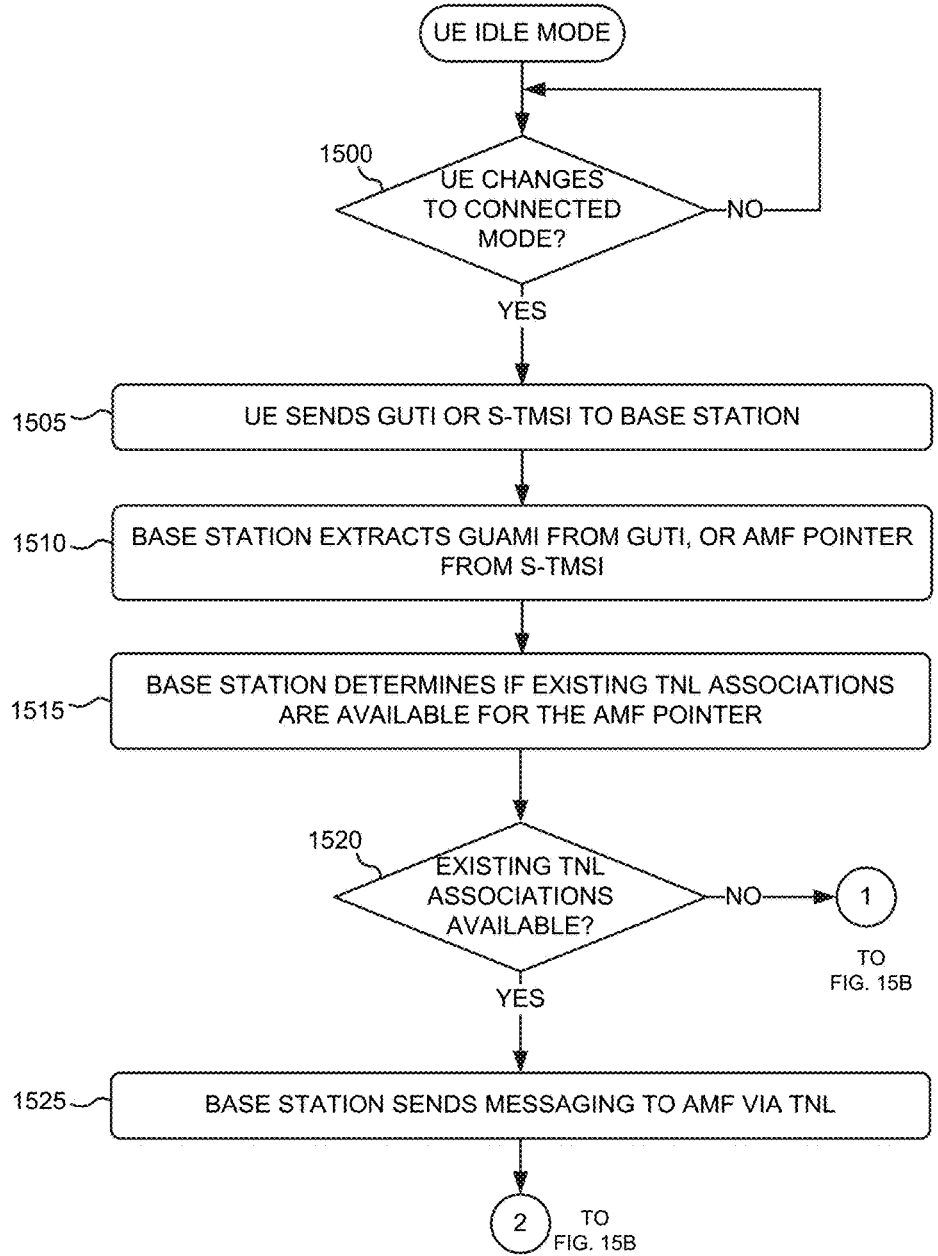
FIGS. 15A-15C are flow diagrams illustrating another embodiment of an exemplary process for returning a user equipment to a connected state subsequent to an initial attach and the user equipment entering an idle mode.
Figure 15B:
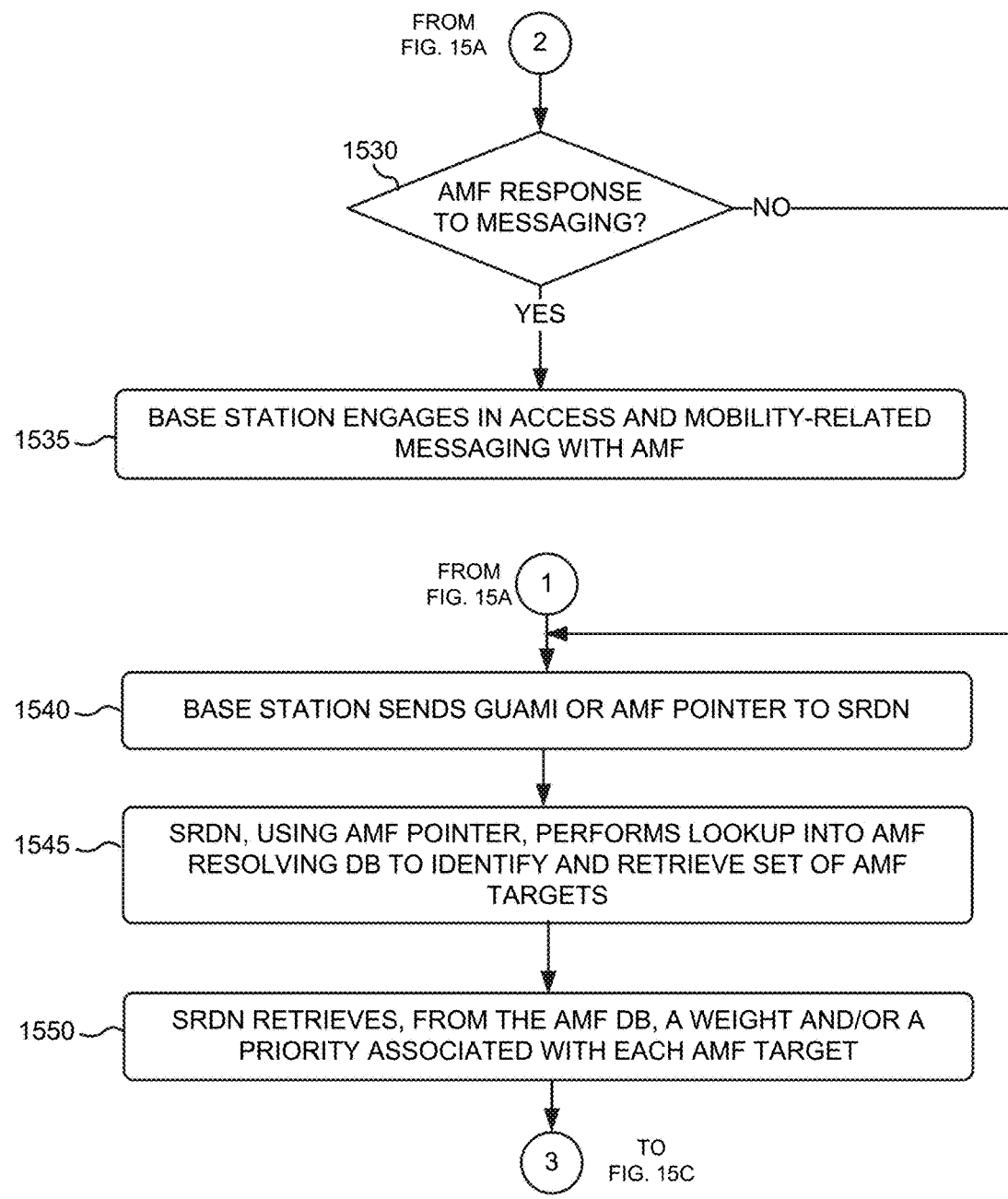
Figure 15C:
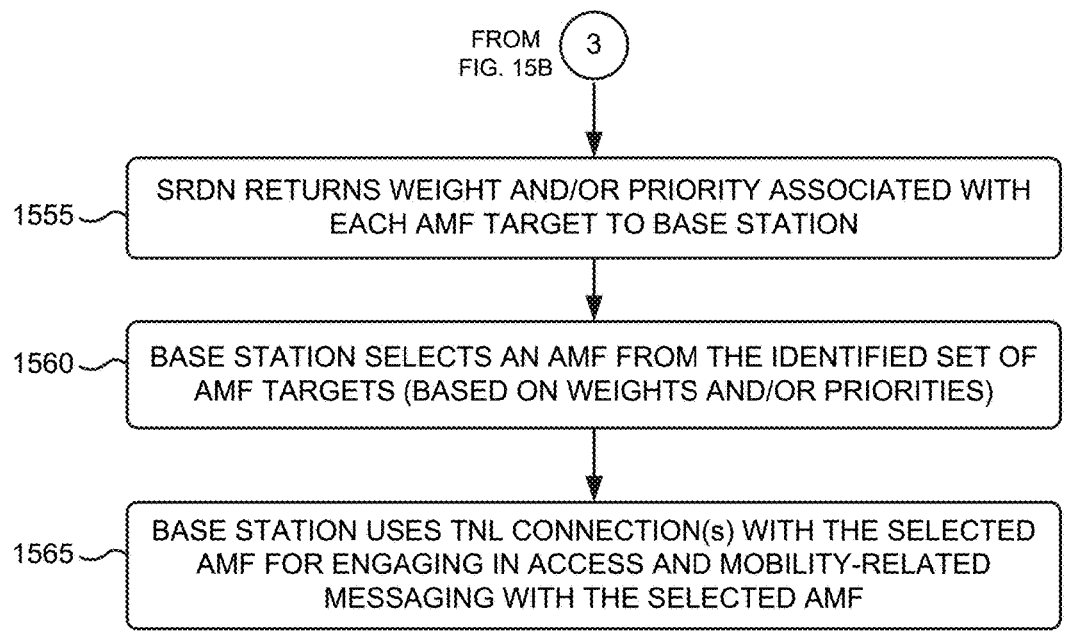

FIGS. 15A-15C are flow diagrams illustrating another embodiment of an exemplary process for returning a UE 105 to a connected state subsequent to an initial attach and the UE entering idle mode. In this embodiment, the SRDN 120 is used to resolve the GUAMI under circumstances in which existing TNL associations are not available for the AMF pointer or if the AMF instances do not respond. The exemplary process of FIGS. 15A-15C may be implemented by UE 105, base station 130, and SRDN 120. The exemplary process of FIGS. 15A-15C is described with reference to the messaging/operation diagrams of FIGS. 16A and 16B.

The exemplary process includes a determination at UE 105 whether UE 105 changing from an idle mode to a connected mode (block 1500). If the UE 105 continues in idle mode (NO—block 1500), then block 1500 may be repeat. A user of the UE 105 may not use any communication functions on the UE 105 for a period of time, and the UE 105 may enter the idle mode to, for example, conserve battery power. During the idle mode, the UE 105 may shut down one or more functions or components of UE 105, and the network(s) 110-1 may determine UE 105 to be temporarily disconnected until the UE 105 sends a GUTI or S-TMSI to a base station 130 of network(s) 110-1 indicating that it is returning to a connected state.

Figure 16A:
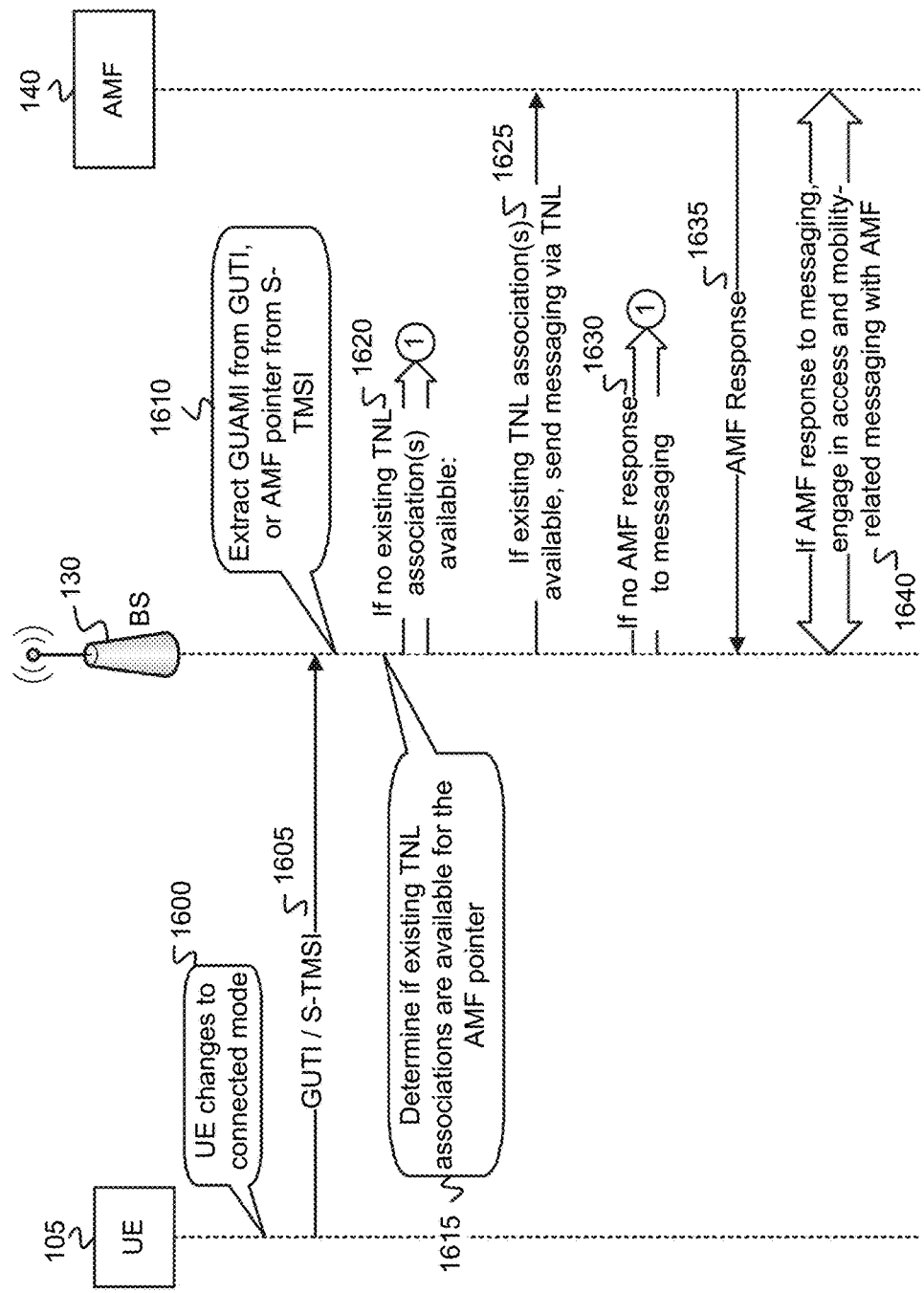
FIGS. 16A and 16B are exemplary messaging and operation diagrams associated with the process of FIGS. 15A-15C.

If the UE 105 is determined to be changing to a connected mode (YES—block 1500), then UE 105 sends a GUTI or S-TMSI to a base station 130 that is currently serving the UE 105 (block 1505), and base station 130, upon receipt, extracts the GUAMI from the GUTI, or the AMF pointer from the S-TMSI (block 1510). FIG. 16A depicts UE 105 changing 1600 to a connected mode and sending a GUTI/S-TMSI 1605 to base station 130, and base station 130 extracting 1610 the GUAMI from the GUTI, or the AMF pointer from the S-TMSI.

Base station 130 determines if existing TNL associations are available for the AMF pointer (block 1515). If existing TNL associations are not available for the AMF pointer (NO—block 1520), then the process continues at block 1540 of FIG. 15B. If existing TNL associations are available for the AMF pointer (YES—block 1520), then base station 130 sends messaging to the AMF via a TNL connection (block 1525). Base station 130 performs a look up into local memory to retrieve, using the AMF pointer, TNL connection information (i.e., stored in block 1130 of FIG. 11B) for one or more TNL connections set up between base station 130 and a particular AMF 140. If there is no TNL connection information stored in association with the AMF pointer in local memory, than existing TNL associations are not available for the AMF pointer. If there is TNL connection information stored in association with the AMF pointer in local memory, than existing TNL associations are available for the AMF pointer, and base station 130 retrieves the TNL connection information from local memory to use for sending messaging to the AMF 140 via one of the TNL connections detailed in the TNL connection information. FIG. 16A depicts that, if no existing TNL association(s) are available 1620, operations/messaging continues in FIG. 16B. FIG. 16A further shows that, if existing TNL association(s) are available, then messaging 1625 is sent via a TNL.

Base station 130 determines if there is any response from the AMF to the messaging (block 1530). Base station 130 may, for example, set a specific timer length to determine whether a response from the AMF is received within the period of time established by the timer (e.g., response received within 4 seconds). AMF 140 may fail to respond within the period of time established by the timer due to, for example, failure of the network device in which the AMF 140 is installed, excessive network congestion in the network 110 in proximity to the AMF 140, etc. If no response is received within the timer period, than base station 130 determines that there has been no response to the messaging sent in block 1525. If there is no AMF response to the messaging (NO—block 1530), then the process continues at block 1540 of FIG. 15B. FIG. 16A depicts that, if no AMF response to the messaging is received at base station 130, then operations/messaging continues at FIG. 16B.

If there is an AMF response to the messaging (YES—block 1530), then base station 130 engages in access and mobility-related messaging with the AMF (block 1535). Base station 130 may engage in messaging associated with any type of network access functions and/or mobility management functions performed by AMF 140 to control access by, or enable roaming on the part of, a UE 105 serviced by base station 130. FIG. 16A depicts an AMF response 1635 sent from AMF 140 to base station 130, and base station 130 engaging 1640 in access and/or mobility-related messaging with the AMF 140 subsequent to receipt of the AMF response 1635.

Figure 16B:
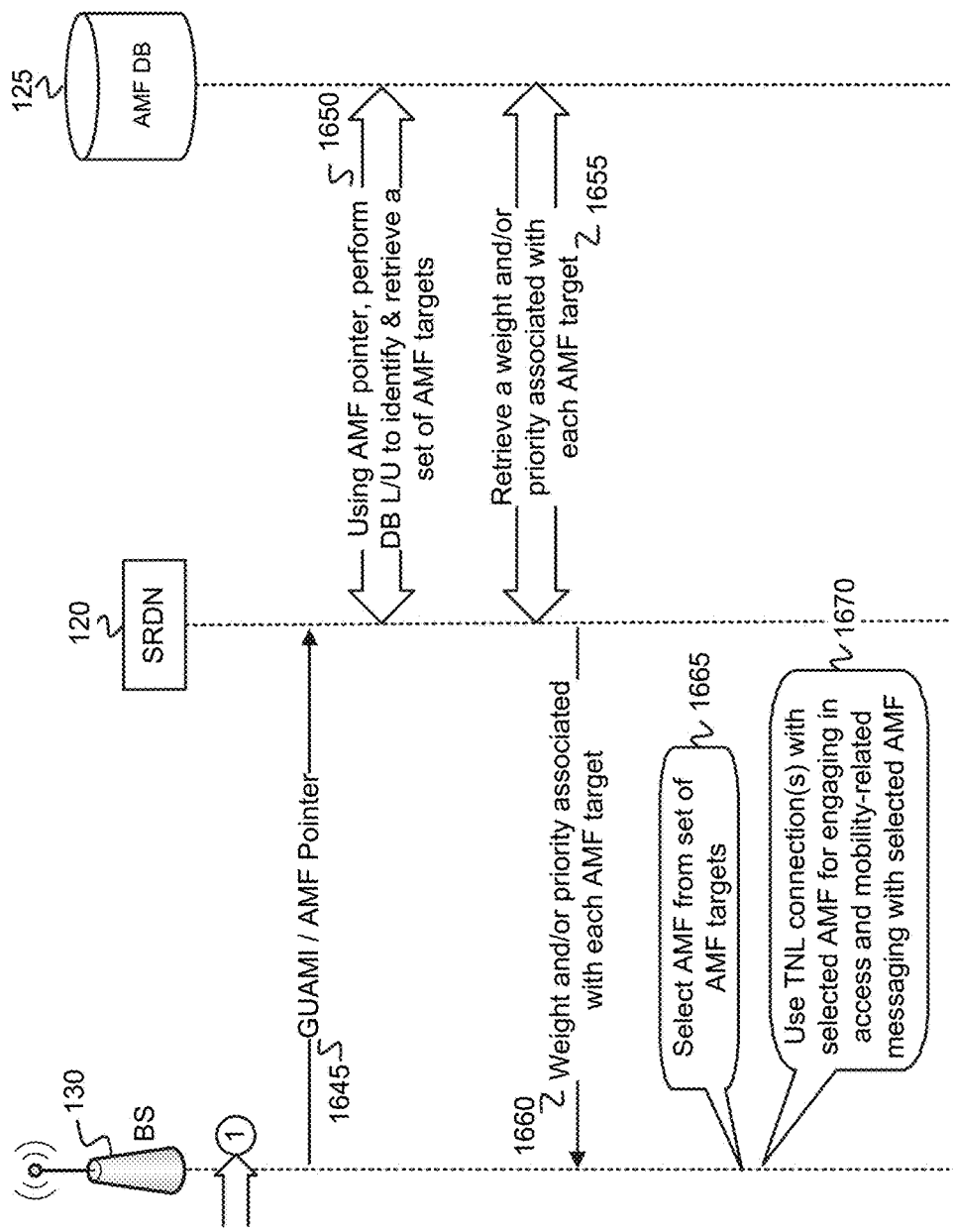

At block 1540, base station 130 sends the GUAMI or AMF pointer to SRDN 120, and SRDN 120, using the AMF pointer, performs a lookup into AMF DB 125 to identify and retrieve a set of AMF targets (block 1545). SRDN 120 performs a look-up into AMF DB 125 to identify every entry 400 having at least one AMF pointer value in fields 410 that matches the AMF pointer received from base station 130, or retrieved from the GUAMI received from the base station 130. For every entry 400 having the matching AMF pointer in field 410, SRDN 120 retrieves an AMF ID value from each AMF ID field 405 to identify the set of AMF targets. FIG. 16B depicts base station 130 sending a GUAMI/AMF pointer 1645 to SRDN 120, and SRDN 120 using the AMF pointer to perform 1650 a database look-up to identify and retrieve a set of AMF targets.

SRDN 120 retrieves, from the AMF DB 125, a weight and/or a priority associated with each AMF target (block 1550), and returns the weight and/or priority associated with each AMF target of the set of AMF targets to base station 130 (block 1555). For every entry 400 identified having at least one AMF pointer in fields 410 that matches the AMF pointer received from base station 130, or retrieved from the GUAMI received from the base station 130, SRDN 120 additionally retrieves a weight value from AMF weight field 440, and/or a priority value from AMF priority field 445 for each of the entries 400. FIG. 16B depicts SRDN 120 retrieving 1655 a weight and/or a priority associated with each AMF target. FIG. 16B further depicts SRDN 120 returning 1660 the weight and/or priority associated with each AMF target of the set of AMF targets to base station 130.

Base station 130 selects an AMF from the identified set of AMF targets based on the weights and/or priority (block 1560), and uses a TNL connection(s) with the selected AMF for engaging in access and mobility related messaging with the selected AMF (block 1565). Base station 130 may, using the TNL connection(s), engage in messaging associated with any type of network access functions and/or mobility management functions performed by the selected AMF 140 to control access by, or enable roaming on the part of, a UE 105 serviced by base station 130. FIG. 16B depicts base station 130 selecting 1665 an AMF 140 from the set of AMF targets. FIG. 16B further depicts base station 130 using 1670 the TNL connection(s) with the selected AMF for engaging in access and mobility-related messaging with the selected AMF.

The blocks of the exemplary process of FIGS. 15A-15C may be executed subsequent to an initial attach to the wireless network of network(s) 110-1, and after UE 105 enters an idle mode.

Figure 17:
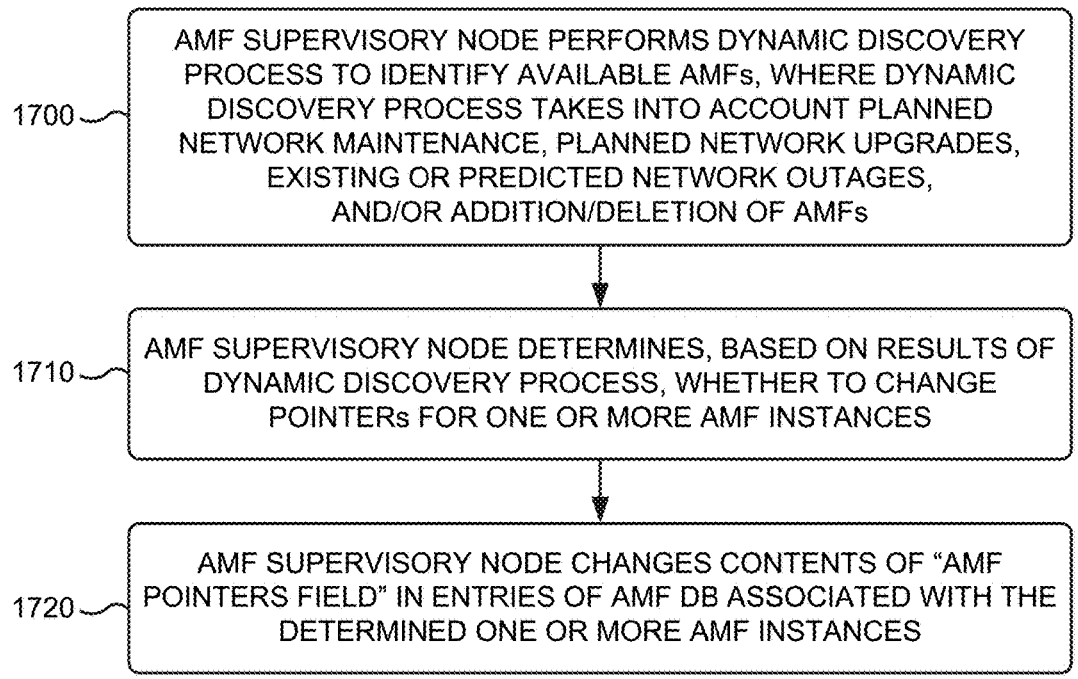
FIG. 17 is a flow diagram illustrating an exemplary process for updating AMF pointers in the AMF database of FIG. 1 based on an analysis of planned network maintenance, planned network upgrades, existing or predicted network outages, and addition or deletion of AMFs.

FIG. 17 is a flow diagram illustrating an exemplary process for updating AMF pointers in AMF DB 125 based on an analysis of planned network maintenance, planned network upgrades, existing or predicted network outages, and addition or deletion of AMFs. The process of FIG. 17 may represent a "background" process that continuously, or periodically, executes "behind" the other processes described herein to maintain up-to-date AMF pointers within AMF DB 125. The exemplary process of FIG. 17 may be implemented by AMF supervisory node(s) 115. The exemplary process of FIG. 17 is described with reference to the exemplary scenario depicted in FIG. 18.

The exemplary process includes AMF supervisory node 115 performing a dynamic discovery process(es) to identify available AMFs within networks 110, where the dynamic discovery process(es) takes into account planned network maintenance, planned network upgrades, existing or predicted network outages, existing or predicted AMF failures, existing or predicted link failures to/from AMFs, and/or addition or deletion of AMFs. The dynamic discovery process(es) may include the execution of one or more algorithms that take into account, and analyze, known events (e.g., planned maintenance, planned upgrades), keep track of and analyze existing outages or predict future outages, track and analyze additions or deletions of AMF instances from networks 110, and/or predict future AMF additions or deletions to determine AMF instances 140 that are currently active and available for use. The one or more algorithms may include a hierarchical algorithm(s), an analytic-based algorithm(s), and/or a machine learning-based algorithm(s). Referring to the exemplary scenario depicted in FIG. 18, AMF supervisory node(s) 115 determines that AMF NW2 140-2 has failed (shown with an "X"), and is currently not available for use, and that AMFs NW1 140-1, NW3 140-3, NW4 140-4, and NW5 140-5 are currently available.

Figure 18:
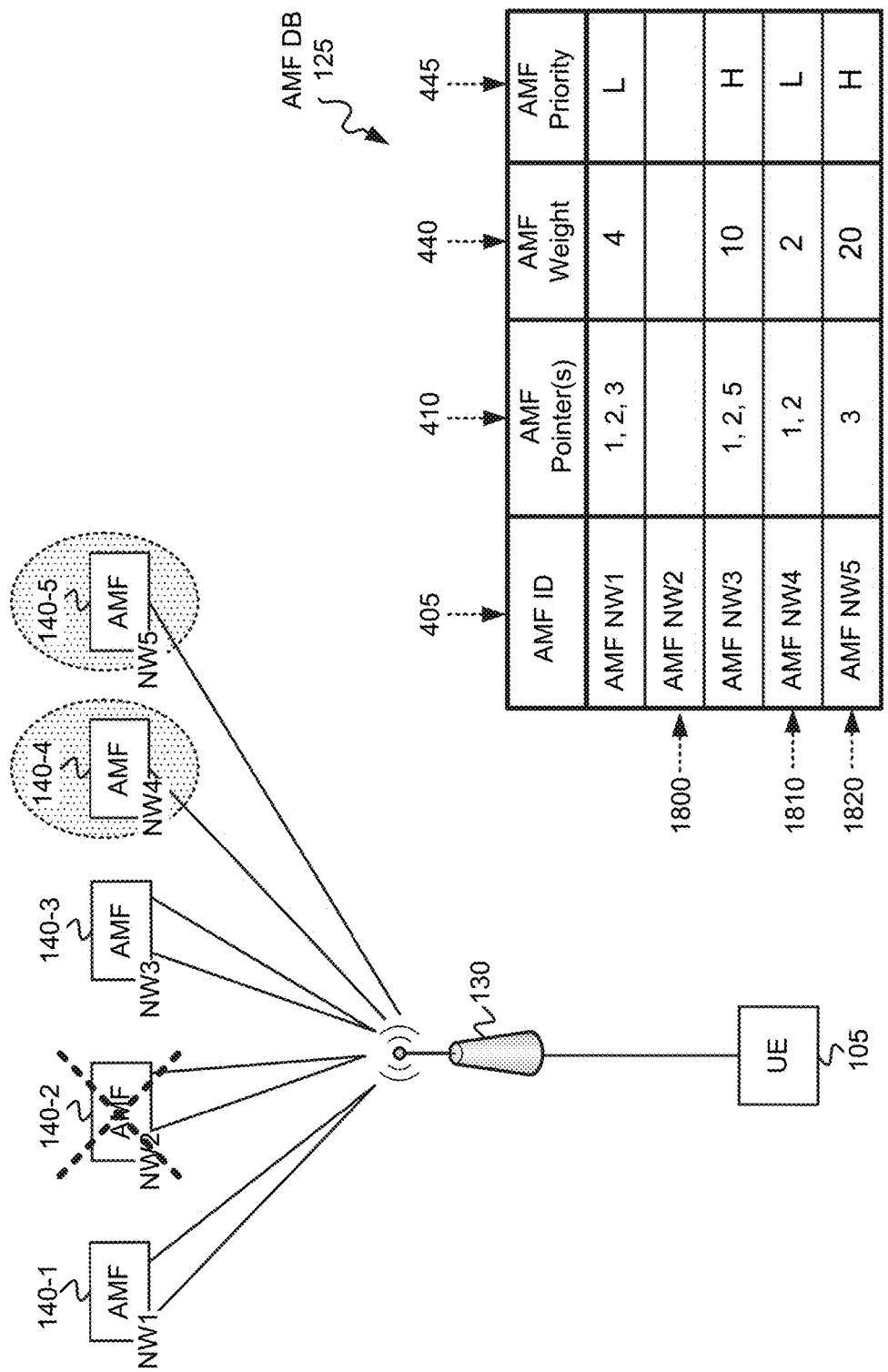
FIG. 18 depicts an exemplary scenario occurring in the network environment of FIG. 1 in which the exemplary process of FIG. 17 is implemented.

AMF supervisory node 115 determines, based on results of the dynamic discovery process, whether to change pointers for one or more AMF instances within AMF DB 125 (block 1710). As shown in FIG. 18, AMF supervisory node 115 (not shown) determines that AMFs NW4 140-1 and NW5 140-5 (shown highlighted) need to have their AMF pointer values changed due to, among other factors, the failure of AMF NW2 140-2. AMF supervisory node 115 changes contents of AMF pointer(s) field 410 of entries 400 of AMF DB 125 associated with the determined one or more AMF instances (block 1720). As shown in the example of FIG. 18, the AMF pointers in AMF pointer(s) field 410 of entry 1800 for AMF NW2 are removed (eliminating AMF NW2 from subsequent look-ups in AMF DB 125), the AMF pointer(s) field 410 of entry 1800 for AMF NW4 is changed to AMF pointers 1 and 2, and AMF pointer(s) field 410 of entry 1810 for AMF NW5 is changed to AMF pointer 3. The continuous, or periodic, updating of AMF pointers in fields 410 of AMF DB 125 ensures that AMFs selected for handling access and/or mobility management functions for a UE 105 are currently available. Though not described above, block 1720 may additionally include updates to weight values in fields 440, and priority values in fields 445 of AMF DB 125 based on the results of the dynamic discovery process performed in block 1700.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5, 7, 9, 11A-11B, 13A-13B, 15A-15C, and 17, and message/operation flows with respect to FIGS. 6, 8, 10, 12, 14A, and 16A-16B, the order of the blocks and/or message/operation flows may be varied in other implementations.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   determining, by a first network device, a set identifier (ID) associated with a first set of management instances in at least one network, wherein the management instances execute at least one of network access or mobility management functions for user equipment (UE) interaction with a wireless network and wherein a first management instance is a member of the first set of management instances;
   determining a first pointer value associated with the first management instance;
   generating a first global ID, for the first management instance, that includes the set ID and the first pointer value;
   installing the first management instance at a second network device, along with the first global ID, the set ID, and the first pointer value; and
   changing the first pointer value in response to an event associated with the wireless network,
   wherein the first pointer value and the set ID are used for selecting a management instance for servicing a wireless service request from a UE to the wireless network.

2. The method of claim 1, wherein the event is associated with planned maintenance, a planned upgrade, or an existing or predicted outage of the wireless network.

3. The method of claim 1, further comprising:
   determining a second pointer value associated with the first management instance; and
   generating a second global ID, for the first management instance, that includes the set ID and the second pointer value,
   wherein the selecting the management instance for servicing the wireless service request from the UE to the wireless network further uses the second pointer value, and
   wherein installing the first management instance at the second network device further includes installing the second global ID and the second pointer value.

4. The method of claim 3, further comprising:
   changing the second pointer value in response to the event associated with the wireless network.

5. The method of claim 1, wherein generating the global ID comprises:
   concatenating the set ID with the pointer value to generate the global ID.

6. The method of claim 1, further comprising:
   determining a location or region within the at least one network as a network location to install the first management instance.

7. The method of claim 6, further comprising:
   determining a Mobile Country Code (MCC), a Mobile Network Code (MNC), and a region ID associated with the determined location or region, and
   wherein generating the global ID comprises:
   concatenating the set ID, the first pointer value, the MCC, the MNC, and the region ID to generate the global ID.

8. The method of claim 1, wherein each of the management instances comprises a Mobility Management Entity (MME) or a core Access and Mobility Management Function (AMF).

9. A first network device, comprising:
   a communication interface; and
   a processing unit, coupled to the communication interface, and configured to:
   determine a set identifier (ID) associated with a first set of management instances in at least one network, wherein the management instances execute at least one of network access or mobility management functions for user equipment (UE) interaction with a wireless network and wherein a first management instance is a member of the first set of management instances, determine a first pointer value associated with the first management instance, generate a first global ID, for the first management instance, that includes the set ID and the first pointer value, install, via the communication interface, the first management instance at a second network device, along with the first global ID, the set ID, and the first pointer value, and change the first pointer value in response to an event associated with the wireless network, wherein the first pointer value and the set ID are used for selecting a management instance for servicing a wireless service request from a UE to the wireless network.

10. The first network device of claim 9, wherein the event is associated with planned maintenance, a planned upgrade, or an existing or predicted outage of the wireless network.

11. The first network device of claim 9, wherein the processing unit is further configured to:

determine a second pointer value associated with the first management instance;

generate a second global ID, for the first management instance, that includes the set ID and the second pointer value, wherein the second pointer value is further used for selecting the management instance for servicing the wireless service request from the UE to the wireless network, and wherein installing the first management instance at the second network device further includes installing the second global ID and the second pointer value.

12. The first network device of claim 10, wherein the processing unit is further configured to:

change the second pointer value in response to the event associated with the wireless network.

13. The first network device of claim 9, wherein, when generating the global ID, the processing unit is configured to:

concatenate the set ID with the pointer value to generate the global ID.

14. The first network device of claim 9, wherein the processing unit is further configured to:

determine a location or region within the at least one network as a network location to install the first management instance.

15. The first network device of claim 14, further comprising:

determining a Mobile Country Code (MCC), a Mobile Network Code (MNC), and a region ID associated with the determined location or region, and wherein generating the global ID comprises:

concatenating the set ID, the first pointer value, the MCC, the MNC, and the region ID to generate the global ID.

16. A non-transitory storage medium storing instructions executable by a processing unit associated with a first network device, wherein the instructions comprise instructions to cause the processing unit to:

determine a set identifier (ID) associated with a first set of management instances in at least one network, wherein the management instances execute at least one of network access or mobility management functions for user equipment (UE) interaction with a wireless network and wherein a first management instance is a member of the first set of management nodes;

determine a first pointer value associated with the first management instance;

generate a first global ID, for the first management instance, that includes the set ID and the first pointer value;

install the first management instance at a second network device, along with the first global ID, the set ID, and the first pointer value; and change the first pointer value in response to an event, wherein the event is associated with planned maintenance, a planned upgrade, or an existing or predicted outage of the wireless network, wherein the first pointer value is used for selecting a management instance for servicing a wireless service request from a UE to the wireless network.

17. The non-transitory storage medium of claim 16, wherein the instructions comprise instructions to cause the processing unit to:

determine a second pointer value associated with the first management instance; and generate a second global ID, for the first management instance, that includes the set ID and the second pointer value, wherein the second pointer value is further used for selecting the management instance for servicing the wireless service request from the UE to the wireless network, and wherein installing the first management instance at the second network device further includes installing the second global ID and the second pointer value.

18. The non-transitory storage medium of claim 17, wherein the instructions comprise instructions to cause the processing unit to:

change the second pointer value in response to the event associated with the wireless network.

19. The non-transitory storage medium of claim 16, wherein the instructions comprise instructions to cause the processing unit to:

determine a location or region within the at least one network as a network location to install the first management instance.

20. The non-transitory storage medium of claim 19, wherein the instructions comprise instructions to cause the processing unit to:

determine a Mobile Country Code (MCC), a Mobile Network Code (MNC), and a region ID associated with the determined location or region, and wherein the instructions to cause the processing unit to generate the global ID further comprise instructions to cause the processing unit to:

concatenate the set ID, the first pointer value, the MCC, the MNC, and the region ID to generate the global ID.

* * * * *